(12) United States Patent
Healy et al.

(10) Patent No.: US 8,746,558 B2
(45) Date of Patent: Jun. 10, 2014

(54) 3D GLASSES AND RELATED SYSTEMS

(75) Inventors: Andrew Healy, San Francisco, CA (US); Thao D. Hovanky, San Francisco, CA (US); Gregory J. Long, Santa Clara, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 13/634,698

(22) PCT Filed: Mar. 14, 2011

(86) PCT No.: PCT/US2011/028366
§ 371 (c)(1),
(2), (4) Date: Sep. 13, 2012

(87) PCT Pub. No.: WO2011/115917
PCT Pub. Date: Sep. 22, 2011

(65) Prior Publication Data
US 2013/0001306 A1    Jan. 3, 2013

Related U.S. Application Data

(60) Provisional application No. 61/314,044, filed on Mar. 15, 2010, provisional application No. 61/316,277, filed on Mar. 22, 2010, provisional application No. 61/320,502, filed on Apr. 2, 2010.

(51) Int. Cl.
*G06Q 30/00*    (2012.01)

(52) U.S. Cl.
USPC .......................................... 235/385; 235/381

(58) Field of Classification Search
USPC ................... 235/385, 375, 381, 492
See application file for complete search history.

(56) References Cited

U.S. PATENT DOCUMENTS

| 2,440,507 A | 4/1948 | Geralds |
| 2,655,267 A | 10/1953 | Planeta |

(Continued)

FOREIGN PATENT DOCUMENTS

| GB | 2442755 | 4/2008 |
| JP | 2005-175644 | 6/2005 |

(Continued)

OTHER PUBLICATIONS

"XpanD X Series (>> The Red <<)", Sep. 29, 2009, http://matrixeng.com/pdfs/Xpand_the_X_Series.pdf, all pages.*

(Continued)

*Primary Examiner* — Thien M Le

(57) ABSTRACT

3D glasses having an RFID tag (embedded in one or more temples) are rented to theater or other venue operators. The glasses are shipped to a venue for distribution to patrons and collected from patrons in the trays. Inventory and other measures are implemented by RFID scanning while the glasses are in the trays (e.g., upon delivery to a theater, on collection from the theater, upon inspection at the 3D rental company, etc). Data gathered from RFID scanning and inspections allows the rental company to properly allocate rental costs to various venues based on shrinkage which includes, for example, extraordinary wear, breakage, or theft which is attributable and traceable to the specific venues. The theater or venue may also independently scan the trays upon delivery and pick-up to maintain their own records. The invention includes 3D glasses with RFID, a washing rack, and rental systems.

17 Claims, 27 Drawing Sheets

(56) References Cited

U.S. PATENT DOCUMENTS

| | | | |
|---|---|---|---|
| 4,577,764 A | 3/1986 | Silka | |
| 5,853,090 A | 12/1998 | Brozak | |
| 6,254,953 B1 * | 7/2001 | Elston | 428/40.1 |
| D465,352 S | 11/2002 | Kim | |
| 7,005,988 B2 * | 2/2006 | Mathewson et al. | 340/572.4 |
| D519,735 S | 5/2006 | Bentley | |
| 8,080,187 B2 * | 12/2011 | Tepedino et al. | 264/1.32 |
| 2003/0216969 A1 * | 11/2003 | Bauer et al. | 705/22 |
| 2005/0248719 A1 * | 11/2005 | Howell et al. | 351/41 |
| 2006/0077062 A1 * | 4/2006 | Andrechak et al. | 340/572.8 |
| 2007/0221102 A1 * | 9/2007 | Reinhall | 108/57.12 |
| 2008/0218684 A1 | 9/2008 | Howell | |
| 2009/0140036 A1 * | 6/2009 | Haddadi | 235/375 |
| 2011/0012896 A1 * | 1/2011 | Ji | 345/419 |

FOREIGN PATENT DOCUMENTS

| | | |
|---|---|---|
| JP | 2006-139199 | 6/2006 |
| JP | 2007-283043 | 11/2007 |
| WO | 02/21424 | 3/2002 |
| WO | 2006081650 | 8/2006 |
| WO | 2007086808 | 8/2007 |
| WO | 2009005517 | 1/2009 |
| WO | 2009121942 | 10/2009 |

OTHER PUBLICATIONS

Jeff McNall, "3D Glasses Operating Procedure", Jul. 22, 2008, all pages.*

Kooptech S.A. "Storage Trolley for 3D Glasses" introduced at CinemaExpo 2010, Jun. 21, 2010.

* cited by examiner

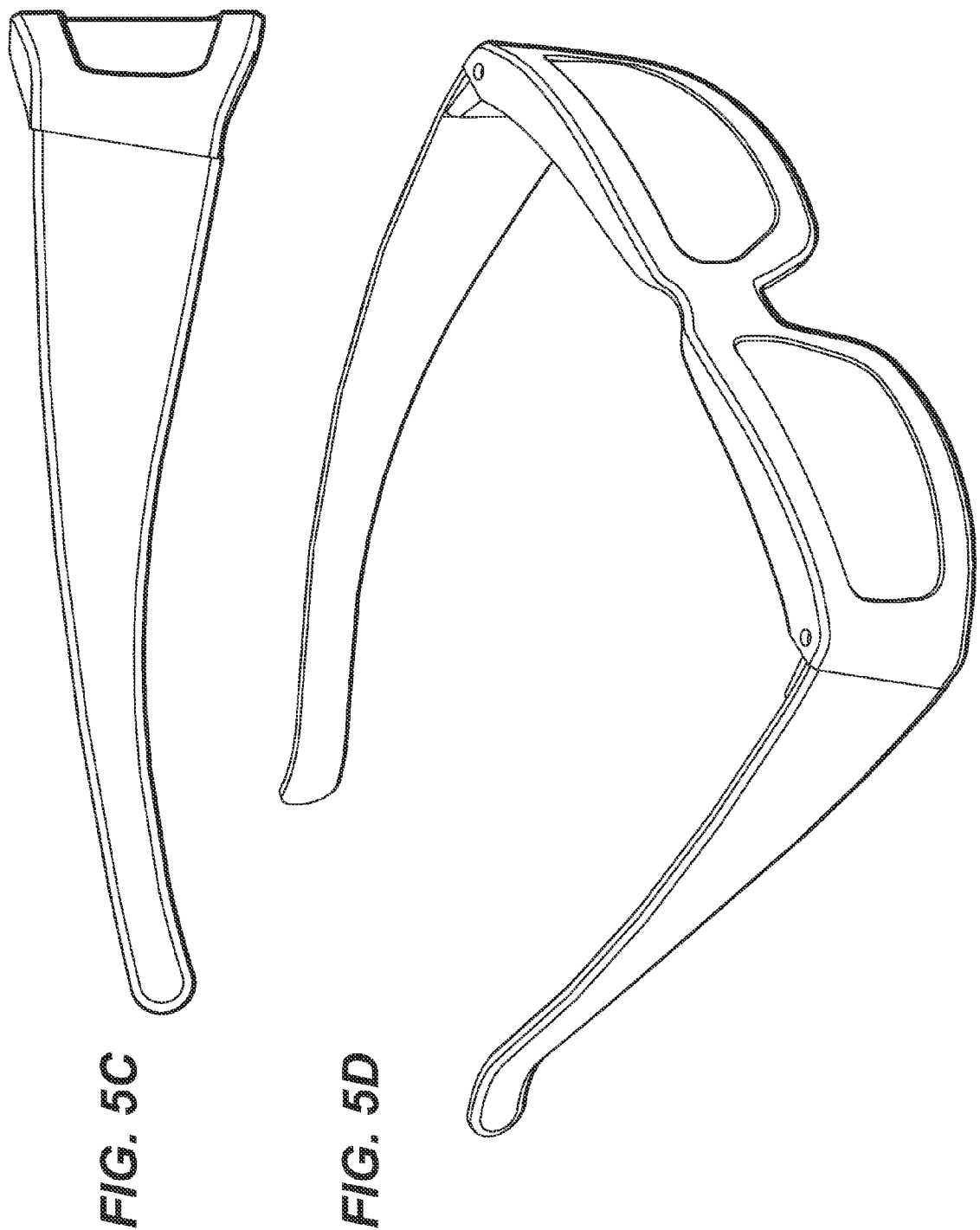

B220

B230

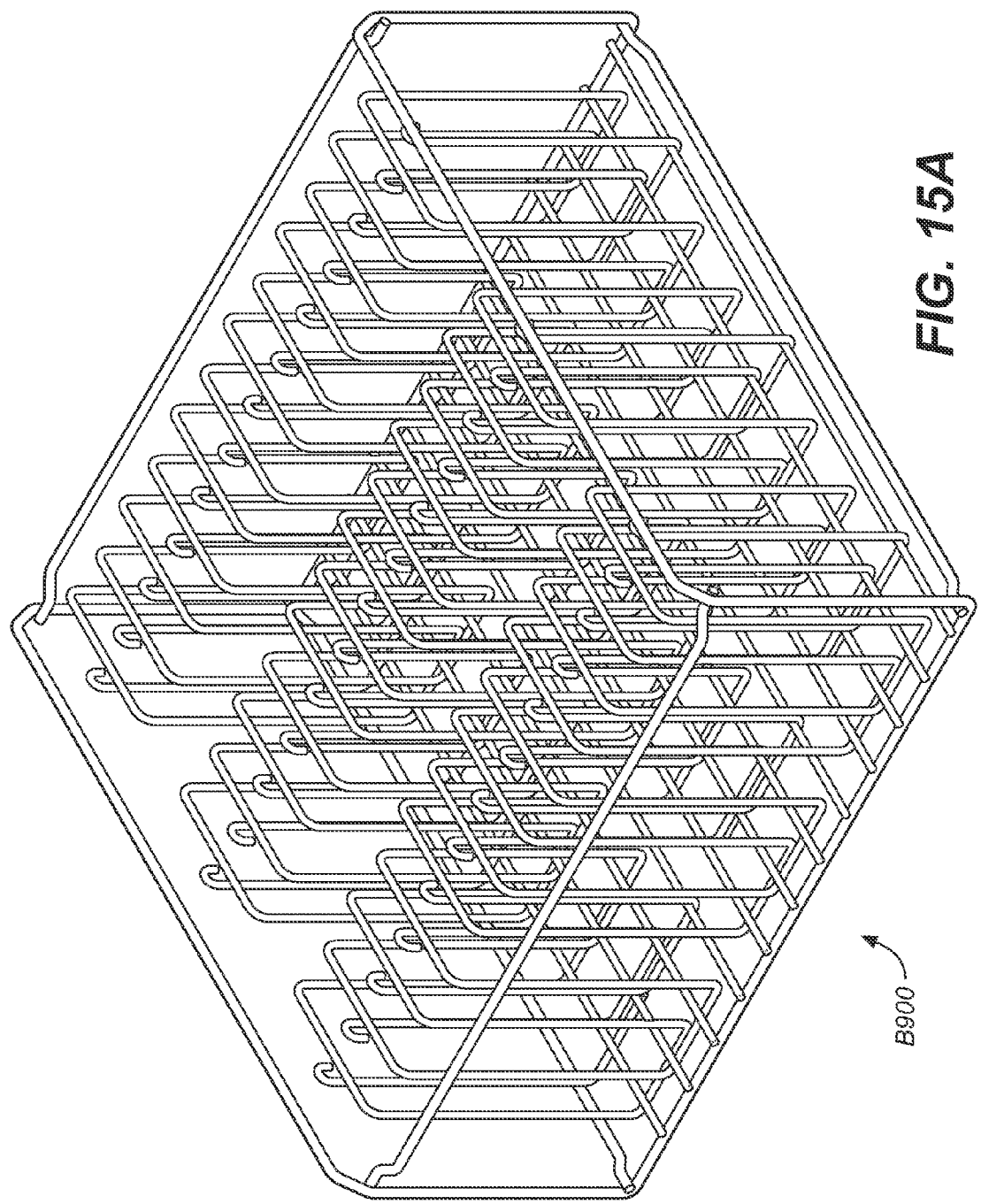

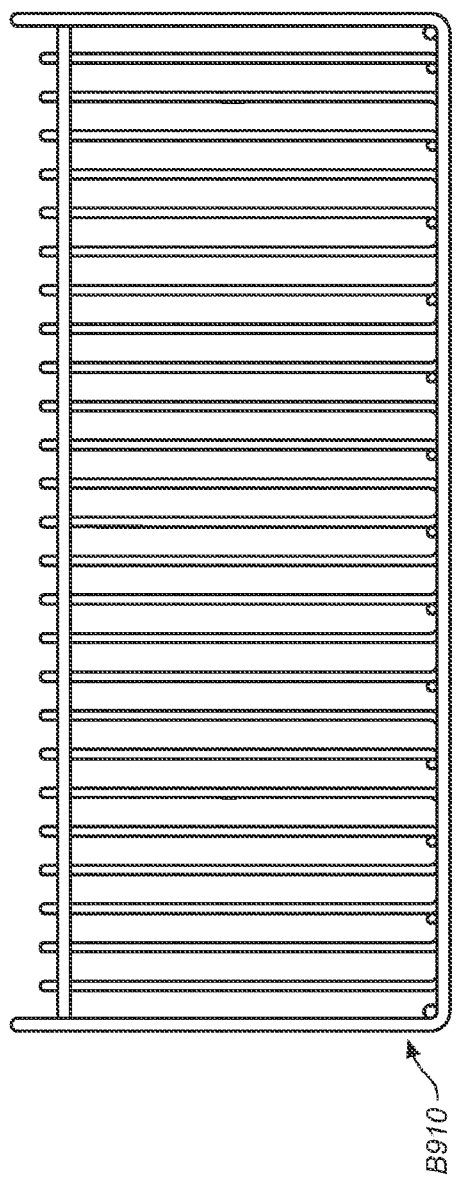
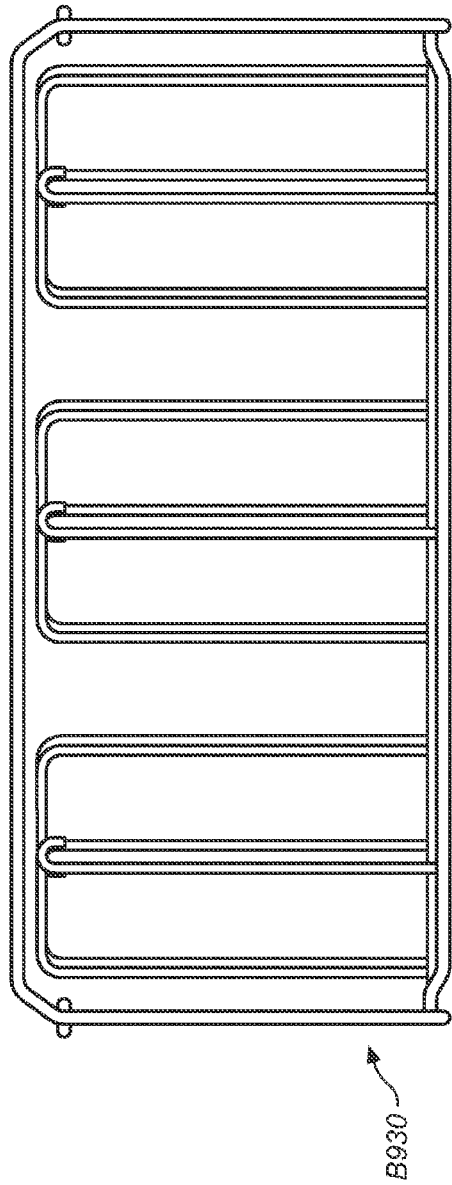

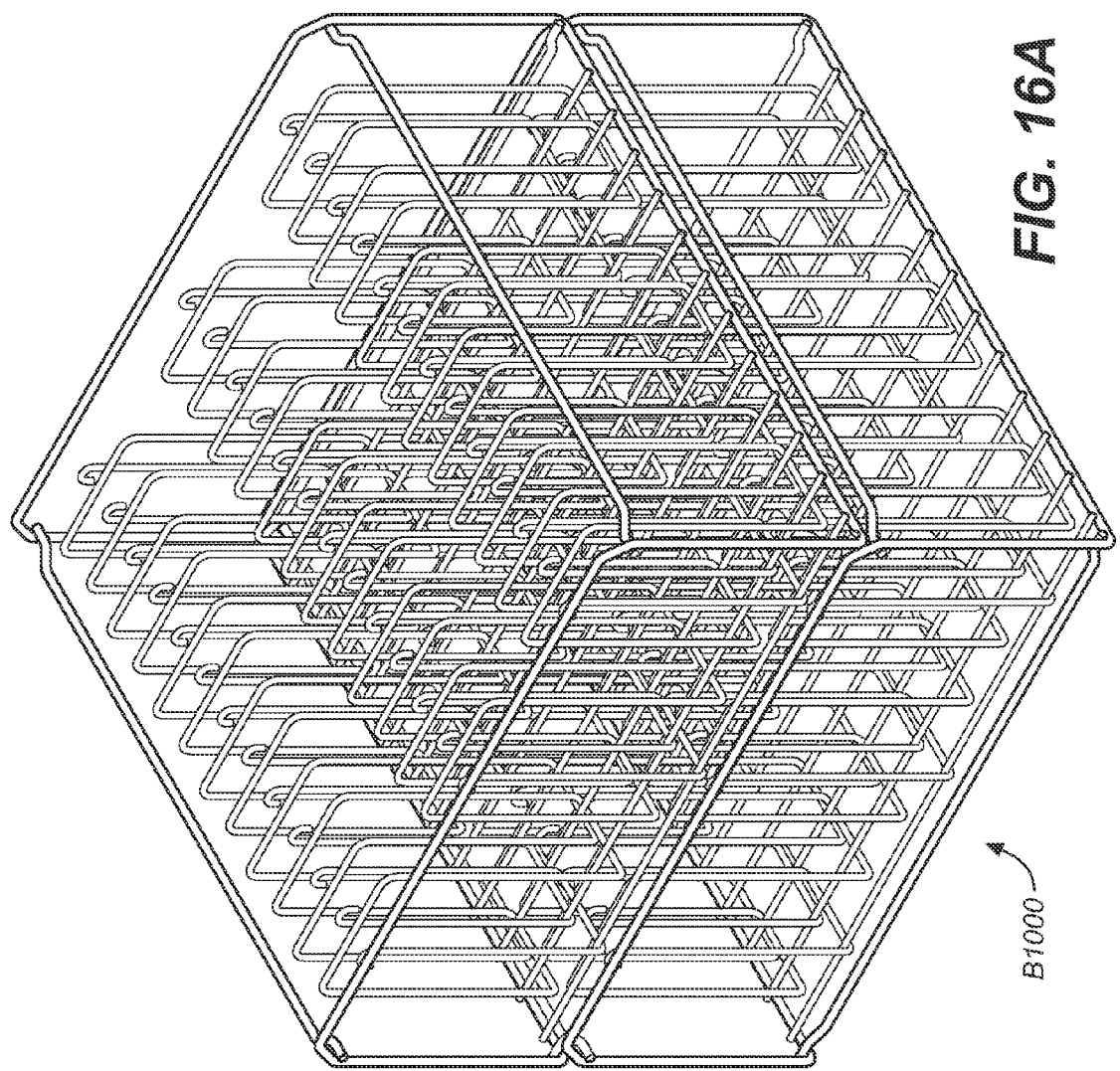

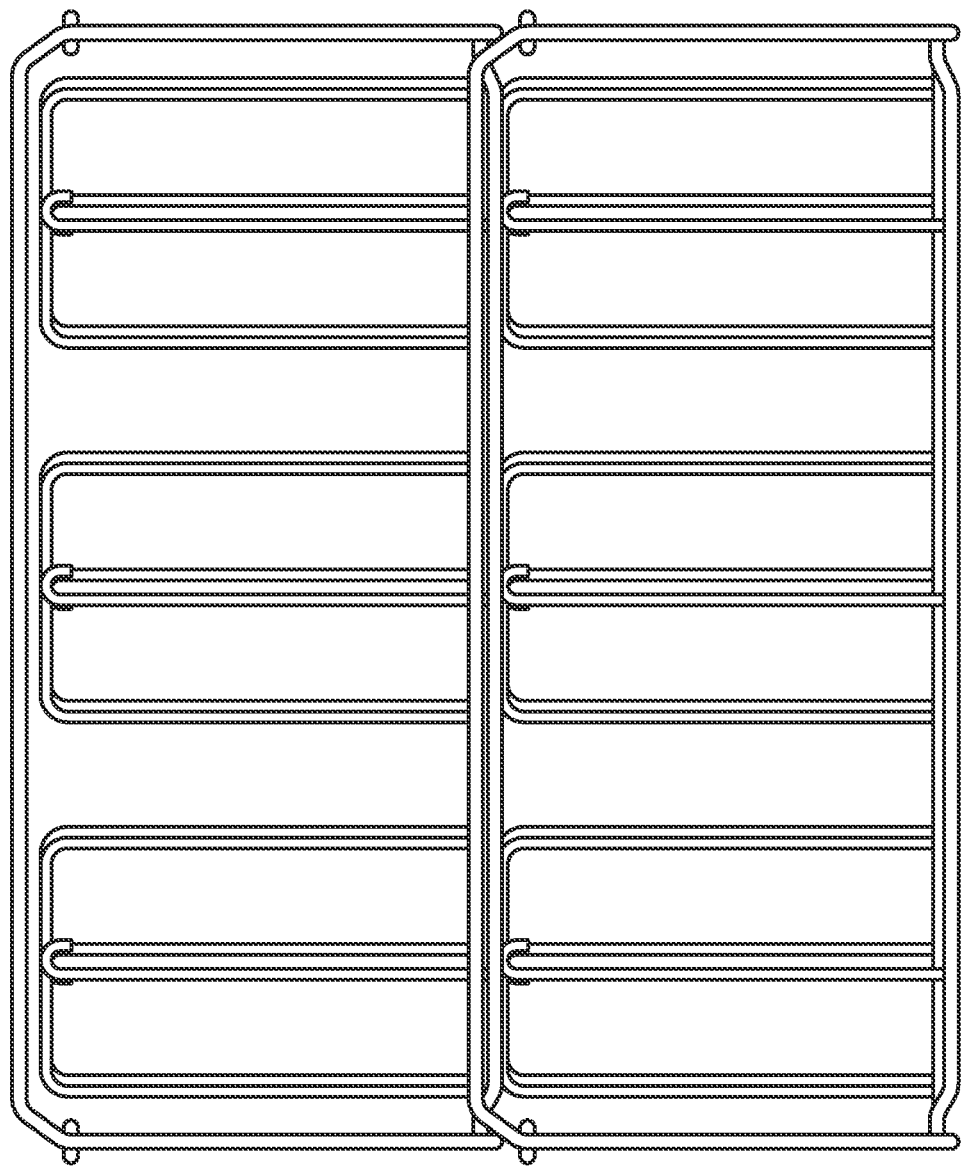

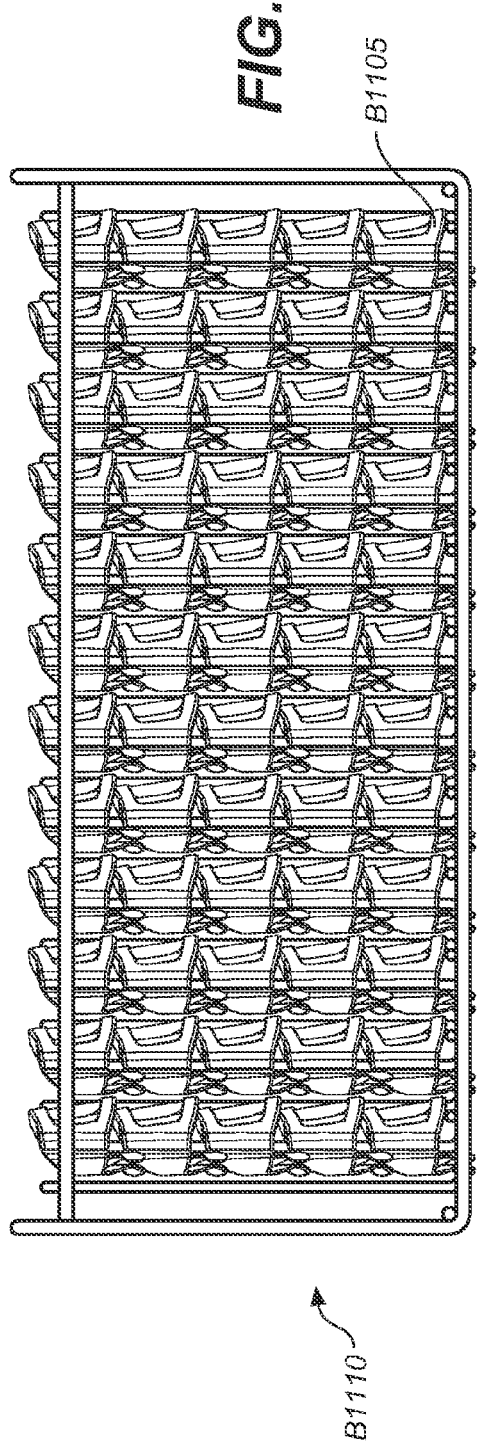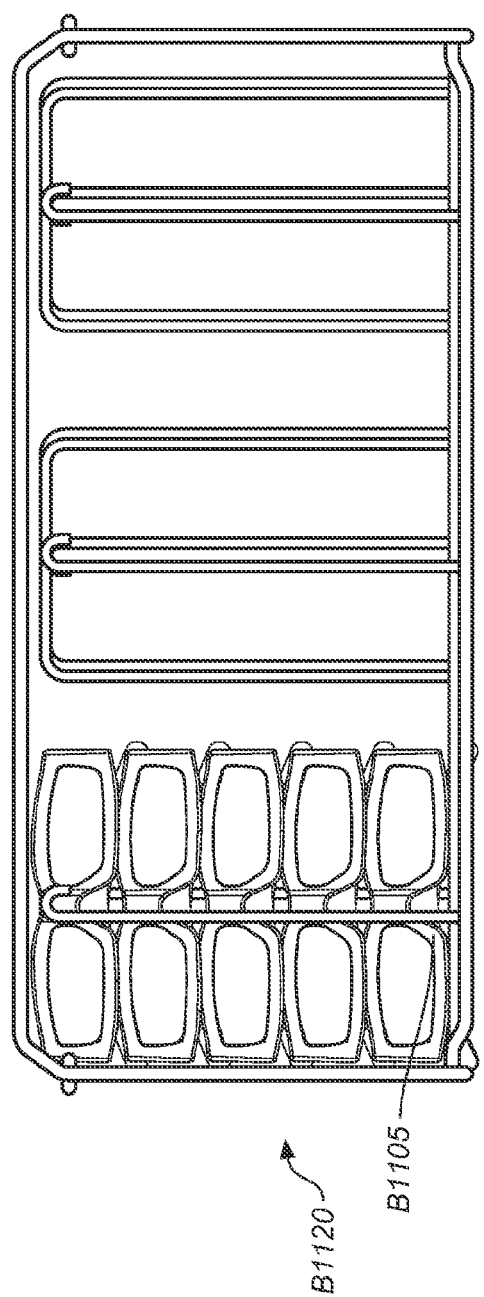

3D GLASSES AND RELATED SYSTEMS

CROSS-REFERENCE TO RELATED APPLICATIONS

This application claims priority to U.S. Patent Provisional Application Nos. 61/314,044, filed 15 Mar. 2010, 61/316,277, filed 22 Mar. 2010, and 61/320,502, filed 2 Apr. 2010, all hereby incorporated by reference in each entireties.

BACKGROUND OF THE INVENTION

1. Field of Invention

The present invention relates to 3D glasses. The present invention also relates to the provision/distribution, ownership, collection, accounting, and management of commodities, particularly rental goods such as 3D glasses, to a venue for use and return for washing/reconditioning, etc. The invention also relates to washing glasses utilized in theater operations and in particular 3D viewing glasses including spectral separation glasses, polarized glasses, and/or shutter glasses that are re-used by theater audiences after washing. The invention is yet further related to the use of RFID integrated into 3D glasses and utilized for, for example, management, analysis, and costing practices.

The present invention also relates to rental systems for glasses or other items and devices/processes utilized in or outside the rental system, such as glasses washing apparatus and particularly racks for transport, storage, distribution, and/or washing of the glasses. The invention also relates to washing glasses utilized in theater operations and in particular 3D viewing glasses including spectral separation glasses, polarized glasses, and/or shutter glasses that are re-used by theater audiences after washing.

2. Description of Related Art

Theater operators showing specialized shows such as 3D cinema have provided audiences with viewing glasses for observation of special effects. In 3D cinema the 3D effect is generally caused by projecting left and right images onto a screen and utilizing glasses to "separate" the images such that the left eye only/mainly views left images and the right eye only/mainly views right images. Techniques for separation may include spectral separation (for example, each eye receives an RGB image, but left eye's RGB image is derived from different portions of the red, green, and blue spectrum compared to the right eye's RGB image). Other forms of separation include polarization (each eye receives an image of a specific polarization), and shutters for each eye that open and close when a corresponding left or right image is being displayed.

Some of the glasses are inexpensive to construct (e.g., made cardboard/plastic frames and plastic/mylar lenses), and are known as disposable glasses. While the quality of the disposable glasses is sufficient to view 3D effects, they are generally not suitable for washing and/or re-use. In the best case, after use, disposable glasses are introduced into a recycling process, or they are discarded. Other premium viewing systems include glasses, and particularly lenses, constructed from harder materials that may be re-used in an environmentally friendly manner after washing. And, washing and re-use of glasses over time may be less expensive than distributing new disposable glasses after each viewing.

SUMMARY OF THE INVENTION

The present inventors have realized the need to track and maintain records for use of commodities such as 3D glasses in a rental or other models of operation. For example, 3D glasses having an RFID tag (e.g., embedded in one or more temples) are rented to theater or other venue operators. The glasses may be shipped to a venue for distribution to patrons and collected from patrons in the trays.

Inventory and other measures may be implemented by RFID scanning while the glasses are in the trays (e.g., upon delivery to a theater, on collection from the theater, upon inspection at the 3D rental company, etc). Data gathered from RFID scanning and inspections allows the rental company to properly allocate rental costs to the various venues based on shrinkage which includes, for example, extraordinary wear of the glasses, breakage, theft, etc., which is attributable and traceable to the specific venues. The theater or venue may also independently scan the trays upon delivery and pick-up to maintain their own records.

In one embodiment, the present invention provides a pair of glasses configured for viewing 3D images and having an RFID tag. The glasses may further comprise an auxiliary antenna that boosts a range in which the RFID tag may be scanned. The auxiliary antenna may be part of (or integrated into) more than one frame member of the glasses. For example, the auxiliary antenna may be attached to or embedded in a temple of the glasses.

The glasses may further comprise an anti-shoplifting device. The RFID tag may be embedded in a first temple of a frame of the glasses, and the anti-shoplifting device may be embedded in one of a same and/or second temple of the frame of the glasses.

In other embodiments, the invention may be a system for monitoring usage of 3D rental glasses, comprising, for example, a plurality of 3D glasses each having an RFID tag, and a delivery, collection, and washing infrastructure configured to deliver the 3D glasses to a 3D venue for use by patrons of the 3D venue, collect used 3D glasses from the 3D venue, wash the 3D glasses, wherein the delivery, collection, and washing performed by the infrastructure is done with the aid of scanning the RFID tags of the glasses for inventory control and efficiency metrics. In one embodiment, the efficiency metrics includes data necessary to calculate a shrinkage factor attributable to a particular 3D venue. In another embodiment, scanning of the RFID tags occurs at least at delivery and collection of the glasses. In another embodiment, scanning of the RFID tags occurs at least at delivery, collection, and upon inspection of the glasses performed either before or after washing.

In various embodiments, a shrinkage factor is billed back to the 3D venue. The shrinkage factor may be utilized to maintain a steady profit margin of a vendor implementing the system. Preferably, the system is implemented by a vendor having an existing relationship that includes delivery of goods and/or services to the 3D venue.

In other embodiments, a plurality of storage and washing racks may be configured to hold at least a portion of the plurality of 3D glasses. Each of the washing and storage racks may include an RFID device associated with the rack.

In various embodiments, at least one scan of the glasses comprises a scan where the RFID of the rack can be associated with each glasses pair in that rack.

A 3D venue according to an embodiment of the present invention may include scanners configured to locate a pair of glasses inside the 3D venue.

In various embodiments, scanning of glasses may be performed upon inspection of the glasses for quality. An electronic database may be configured to track usage, including identification of 3D venue, inspections, and employee handling of each pair of 3D glasses.

The invention may also be embodied as a method, comprising the steps of, delivering a set of pairs of 3D glasses each having RFID tags to a 3D venue, electronically and wirelessly scanning RFID tags of each pair of 3D glasses delivered to the 3D venue, collecting pairs of 3D glasses from the 3D venue, wirelessly and electronically scanning RFID tags of each pair of 3D glasses collected from the 3D venue, and using the delivery and collection scans of the glasses RFID tags to determine billing for use of the 3D glasses by the 3d venue. The billing may include, for example, a standard rental rate plus a shrinkage factor attributable to the 3D venue.

The present inventors have also realized the need to provide an efficient glasses rental model and for more efficient washing of glasses that are re-used in the normal course of theater operations. In one embodiment, the present invention provides a washing rack specifically adapted to securely hold stacked pairs of viewing glasses in manner that creates a hollow column of opposing pairs of viewing glasses. The columns may be oriented vertically, horizontally, or another orientation. In another embodiment, the glasses are stacked in opposition, but are offset.

The washing rack may be constructed in various ways, but preferably includes support members positioned so as to allow the glasses to be stacked efficiently. In one embodiment, the support structures may include an outer frame for maintaining position of the glass frames/arms and one or more securing points to prevent movement of the glasses.

In various embodiments, the washing rack performs "double duty," operating not only as an efficient washing device, but also as a space saving storage device, and as a mechanism for distribution and/or collection of glasses to/from theater patrons. In one embodiment, the washing rack includes handles for easy transport of the washing rack to/from a washing machine and to/from storage, and to/from distribution/collection points as dictated by theater operation processes.

In various embodiments, the washing rack may configured such that stacked glasses are set into the washing rack in a folded configuration (e.g., the frame arms are folded and the glasses are stacked vertically). Such a configuration allows for easier (faster) loading and unloading of the rack.

In various embodiments, the washing rack includes stacking points which are guides or other support members that interlock or otherwise aid in stacking of multiple racks that are placed in a washing machine, or in a storage area.

While the washing rack is suitable for use in any standard washing machine that can accept the rack's dimensions and structures, in various embodiments the washing rack may be specifically configured for one or more particular washing machines. In one embodiments, the support and securing members are positioned such that the hollow columns surrounded by opposing pairs of stacked glasses are centered over water jets and/or extending arm water sprayers that may, for example, extend up into the hollow column during a wash cycle and spray wash toward the glasses frames and lenses (cleaning the interior surfaces of the glasses). In some embodiments, such extending arm sprayers may be positioned between columns and spray in a generally opposite direction (cleaning the exterior surfaces of the glasses).

The present invention includes a method of washing glasses including stacking the glasses in opposite directions. The stacking operation may include, for example, a step of engaging the frames of the glasses in a positioning and/or a securing mechanism(s) of a glasses washing rack. The position of the glasses stacks may be in relation to washing apparatus such as nozzles, spigots, and/or moving sprayers in a washing machine to which the glasses washing rack is to be installed. The method may further include the step of stacking multiple glasses washing racks in a same washing machine. The method may also include steps such as removing the stacked glasses from the glasses washing rack and distributing them to one or more theater patrons and/or collecting the glasses from a theater patron prior to stacking the glasses in the glasses washing rack. The method may further include the steps of stacking a plurality of glasses washing racks in a washing machine, engaging stacking means between the plural glasses washing racks, and removing the glasses washing racks from the washing machine and placing them in a storage area.

In one embodiment, the present invention comprises a theater operation process, comprising a distribution process where glasses stored in a washing rack are distributed to theater patrons, a collection process where the glasses are collected from the theater patrons and re-loaded into the a glasses washing rack, a washing process where the re-loaded glasses washing rack is placed in a washing machine and the glasses are washed. A storage process may also be utilized to place the glasses washing rack in a storage area until needed for a subsequent theater presentation/show.

Portions of both the device, method, and other embodiments may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

The present inventors have also realized the need to provide more efficient washing of glasses that are re-used in the normal course of theater operations. In one embodiment, the present invention provides a washing rack specifically adapted to securely hold stacked pairs of viewing glasses in manner that creates a hollow column of opposing pairs of viewing glasses. The columns may be oriented vertically, horizontally, or another orientation. In another embodiment, the glasses are stacked in opposition, but are offset.

The washing rack may be constructed in various ways, but preferably includes support members positioned so as to allow the glasses to be stacked efficiently. In one embodiment, the support structures may include an outer frame for maintaining position of the glass frames/arms and one or more securing points to prevent movement of the glasses.

In various embodiments, the washing rack performs "double duty," operating not only as an efficient washing device, but also as a space saving storage device, and as a mechanism for distribution and/or collection of glasses to/from theater patrons. In one embodiment, the washing rack includes handles for easy transport of the washing rack to/from a washing machine and to/from storage, and to/from distribution/collection points as dictated by theater operation processes.

In various embodiments, the washing rack includes stacking points which are guides or other support members that interlock or otherwise aid in stacking of multiple racks that are placed in a washing machine, or in a storage area. A dust cover (e.g., lightweight plastic cover or drape) may be utilized to cover the racks while in storage (e.g., between shows) or transit (e.g., from washing machine to distribution area, or during shipment such as from a commercial washing vendor to a theater or other venue) which helps prevent dust from collecting on the lenses of the glasses.

While the washing rack is suitable for use in any standard washing machine that can accept the rack's dimensions and structures, in various embodiments the washing rack may be specifically configured for one or more particular washing machines. In one embodiments, the support and securing members are positioned such that the hollow columns surrounded by opposing pairs of stacked glasses are centered over water jets and/or extending arm water sprayers that may, for example, extend up into the hollow column during a wash cycle and spray wash toward the glasses frames and lenses (cleaning the interior surfaces of the glasses). In some embodiments, such extending arm sprayers may be positioned between columns and spray in a generally opposite direction (cleaning the exterior surfaces of the glasses).

The present invention includes a method of washing glasses including stacking the glasses in opposite directions. The stacking operation may include, for example, a step of engaging the frames of the glasses in a positioning and/or a securing mechanism(s) of a glasses washing rack. The position of the glasses stacks may be in relation to washing apparatus such as nozzles, spigots, and/or moving sprayers in a washing machine to which the glasses washing rack is to be installed. The method may further include the step of stacking multiple glasses washing racks in a same washing machine. The method may also include steps such as removing the stacked glasses from the glasses washing rack and distributing them to one or more theater patrons and/or collecting the glasses from a theater patron prior to stacking the glasses in the glasses washing rack. The method may further include the steps of stacking a plurality of glasses washing racks in a washing machine, engaging stacking means between the plural glasses washing racks, and removing the glasses washing racks from the washing machine and placing them in a storage area.

In one embodiment, the present invention comprises a theater operation process, comprising a distribution process where glasses stored in a washing rack are distributed to theater patrons, a collection process where the glasses are collected from the theater patrons and re-loaded into the a glasses washing rack, a washing process where the re-loaded glasses washing rack is placed in a washing machine and the glasses are washed. A storage process may also be utilized to place the glasses washing rack in a storage area until needed for a subsequent theater presentation/show.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5A-5D are multi-view drawings of 3D glasses with RFID illustrating antenna placement installation options according to embodiments of the present invention;

FIGS. 15A-15D are drawing views of a rack according to another embodiment of the present invention;

FIGS. 16A-16C are drawing views of the rack according to FIGS. 15A-15D stacked with another rack according to the present invention;

FIGS. 17A-17D is a drawing of the rack according to FIGS. 15A-15D loaded with glasses according to an embodiment of the present invention.

DESCRIPTION OF THE PREFERRED EMBODIMENTS

Figure 1:
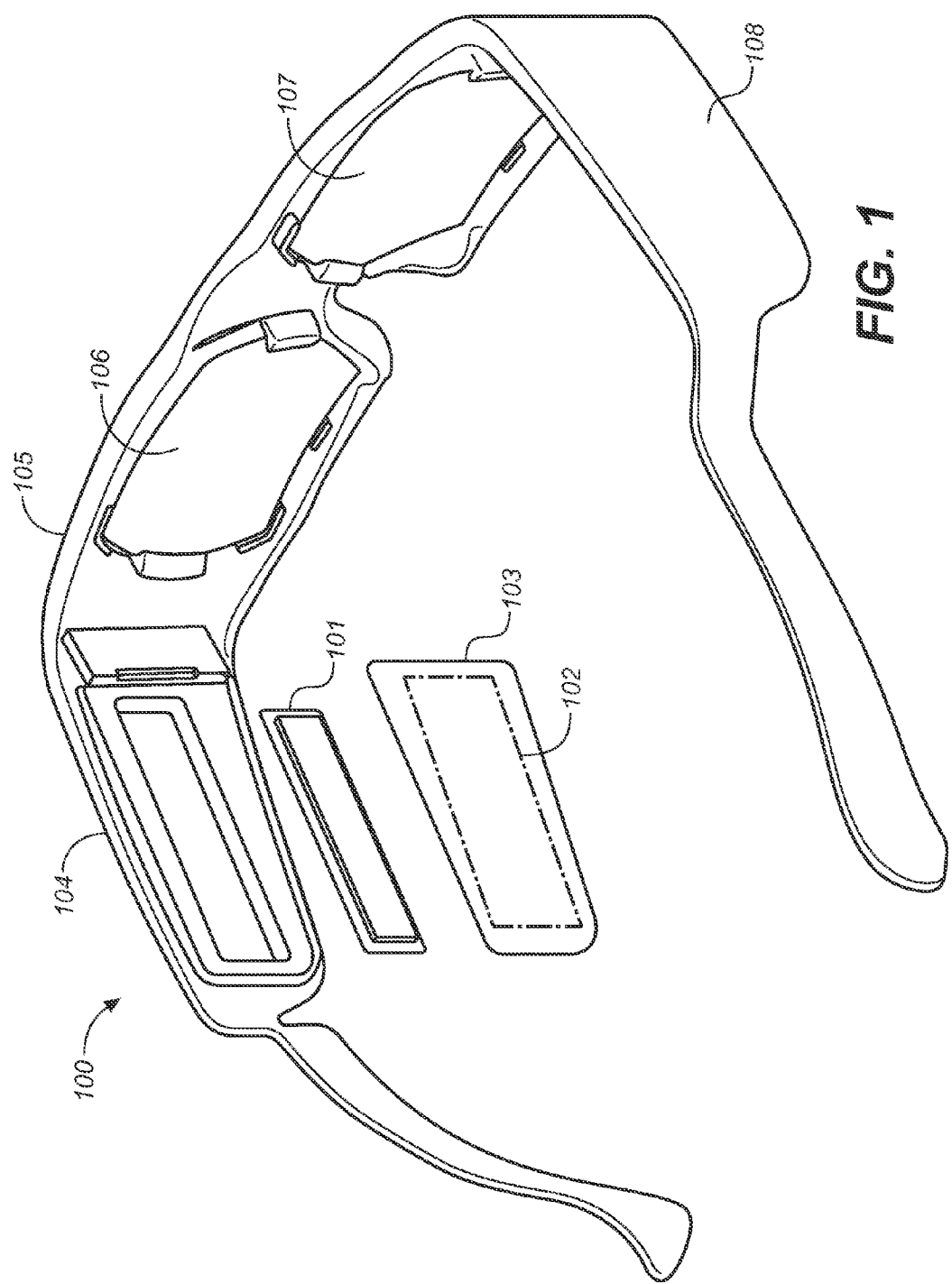
FIG. 1 is a drawing of a pair of 3D glasses with a Radio Frequency Identification (RFID) tag embedded according to an embodiment of the present invention.

Referring now to the drawings, wherein like reference numerals designate identical or corresponding parts, and more particularly to FIG. 1 thereof, there is illustrated a drawing of a pair of 3D glasses 100 with a Radio Frequency Identification (RFID) tag 101 embedded according to an embodiment of the present invention. The 3D glasses may be constructed such that the RFID tag 101 is maintained in a cut-out area of a left temple 104 of the glasses. The tag may be secured to the cut-out area (or, in other embodiments, other portions of the glasses, e.g., nose piece/frame 105, right temple 108, etc) via adhesives or other attachment mechanisms. The RFID tag may be further secured via a cover (e.g., cover 103), and may include a ridge (or grooves) 102 to engage either the RFID tag or matching portions of the cut-out area.

In other embodiments, the RFID tag is molded directly into or on a surface of the glasses. In yet other embodiments, the RFID is attached to the exterior of the frame of the glasses. In yet further embodiments, the RFID tag constitutes a portion of the frame of the glasses (e.g., rather than being, for example, molded into a temple of the glasses, the RFID tag is the temple, or a portion of the temple, of the glasses.

While RFID is specifically discussed, it should be understood that other electronic or wireless mechanisms may be substituted for the RFID tag(s) of the invention along with other related equipment (e.g., scanners) associated with the electronic and/or wireless devices so chosen. It is also assumed that the reader has a basic understanding of 3D glasses, such as 3D glasses 100, which are utilized by theaters and other venues, and that the lenses 106 (left) and 107 (right) are specific to the type of projections utilized (e.g., polarization based, spectral separation, etc.), and the advantages (environmentally and cost savings) that occur by re-use of the glasses.

Right temple 108 may also have embedded an anti-shoplifting device (e.g., a device based on acousto-magnetic technology). In one embodiment, the RFID tag and anti-shoplifting devices are combined and/or embedded in a same area of the glasses frame.

As explained in more detail below, the invention, and particularly the 3D glasses with embedded RFID tag embodiment, will establish or enable one or more methods for data collection used in other aspects and/or embodiments of the invention. For example, the invention allows for embodiments that include metric collection such as customer usage data, glasses quality, date of manufacture, as well as ticketing and re-collection of glasses from theater patrons.

The invention is advantageous in the Rental Model of 3D glasses in that it allows accurate measurements of usage that could enable alternate revenue generating methods including, but not limited to, exhibitor per-glasses licensing, leasing, and distribution. The rental model is explained in Healy et al., U.S. Provisional Patent application 61/316,277, entitled "METHOD AND APPARATUS FOR 3D GLASSES RENTAL SYSTEMS," the contents of which are incorporated herein in their entirety for all purposes.

Data gathered from embedded RFID tags (RFID chips) may be used to forecast replenishment stock due to deterioration of the glasses with use and washing. Data gathered may also be used to highlight theaters with abnormally high failures for follow up corrective action, including increased charges. Quality Assurance procedures or methods may use the data to address field problems, issue corrective action and recover costs from suppliers, as appropriate.

Figure 2:
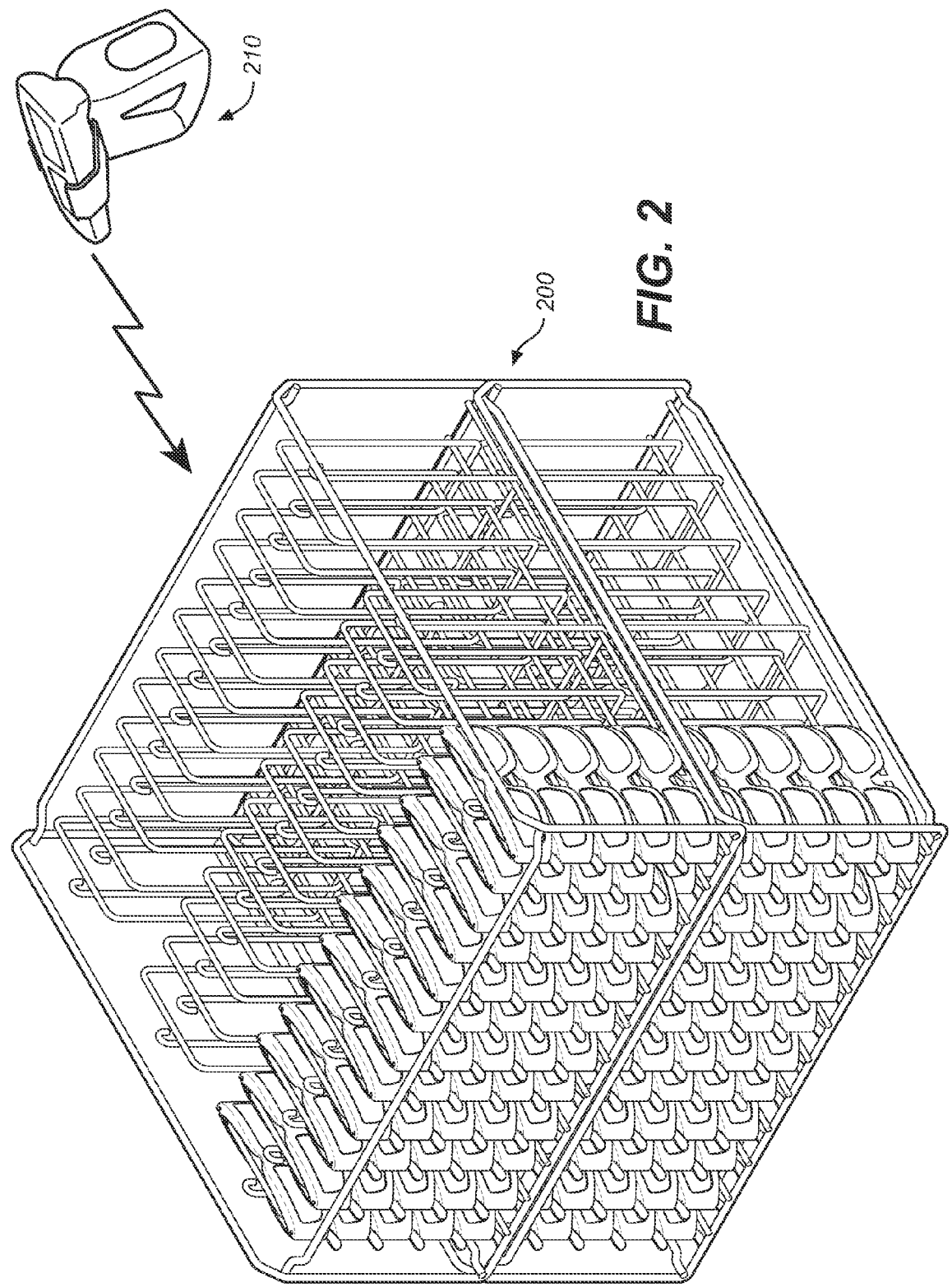
FIG. 2 is an illustration of a tray containing 3D glasses and a scanning device according to an embodiment of the present invention.

FIG. 2 is an illustration of a tray 200 containing 3D glasses and a scanning device (scanner) 210 according to an embodiment of the present invention. The invention or portions thereof may be practiced on individual glasses, in a fully or partially loaded tray, boxed glasses, or glasses in bins, among other possibilities. Preferably, the scanning device is an RFID scanner and operates to takes an inventory of the glasses via acquisition of the RFID tag embedded in each pair of glasses. The scanner may be handheld or mounted in an appropriate scanning location. Multiple scanning devices may be mounted at various points in any process flow. For example, scanners may be mounted at a loading dock, a doorway, at the lift gate of a truck (or loading area of any vehicle designated to transport the trays and/or glasses), at an entrance to a washing area or washing machine, inspection area, etc.

RFID tags may also be used on the trays themselves to track inventory of trays. In one embodiment, scans of glasses loaded in trays populates a database that includes a tray id (or group of tray ids) associated with each pair of glasses scanned. Data from these scans may be utilized, for example, to identify trays that might carry a higher glasses damage rate and may help identify defective trays. In addition, such scans may also be linked to employees who process or transport the trays and thereby identify employees who may need to be counseled on tray handling or other aspects of the business.

Figure 3:
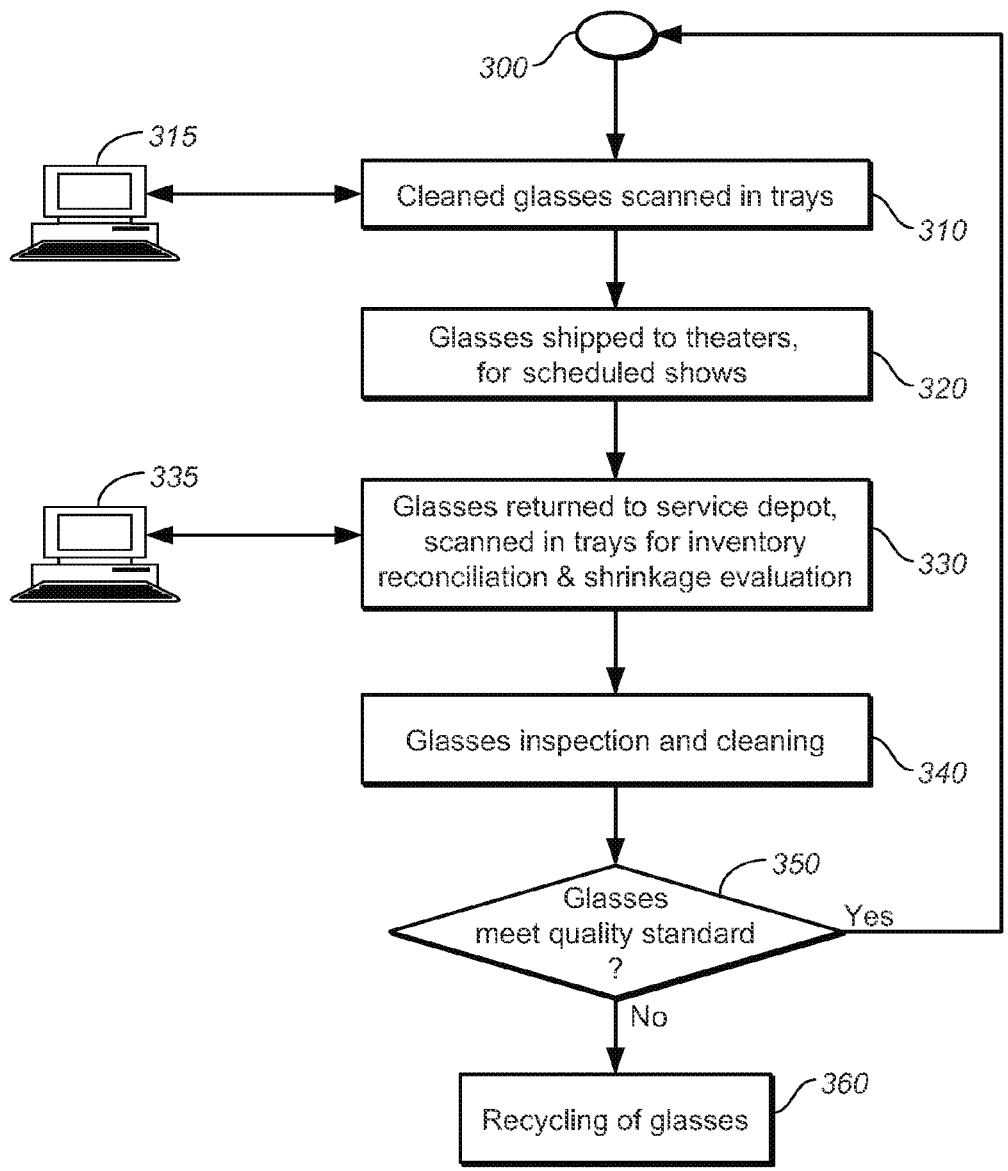
FIG. 3 is a flowchart of a process utilizing 3D glasses with embedded RFID tags according to an embodiment of the present invention.

FIG. 3 is a flowchart of a process 300 utilizing 3D glasses with embedded RFID tags according to an embodiment of the present invention. At step 310, a tray of glasses (e.g., washed glasses) are scanned. The glasses are loaded into a tray that may be similar to tray 200, but other trays and/or packaging may be utilized. The glasses are then shipped to a venue, such as a theater (step 320).

A vendor that delivers the glasses to the theater or other venue may be a same vendor that services other items at the theater such as, for example, replenishment of refreshment supplies, a servicer of vending or gaming machines (e.g., coin-op pinball, electronic games, snacks, etc), or other such service that has an existing infrastructure for delivery to the theaters. The vendor that performs washing and accounting of the glasses may be the same as performs the shipment or make work in conjunction with the shipping vendor.

After delivery, the glasses are distributed from the racks to theater patrons who then use the glasses to view a show or presentation. After use, the glasses are collected and placed back into the trays. Preferably, the glasses are collected by having the patrons put them into the trays (or collected in a bin or other collections device and then placed in the tray by a theater employee or by an employee of the vendor/service company picking up the used glasses).

After loading the trays, the glasses are returned to a service depot (vendor's location) for inventory and/or testing/evaluation (e.g., steps 330 & 340). Inventory and notes of condition/test results are made in conjunction with a scan of the RFID tags in each pair of glasses (scan 335). Inventory includes determining if all of the glasses delivered to the theater were returned. Notes include indications of the type of wear or damage that may have occurred to individual or specific groups of glasses. The glasses are sent for cleaning, which may be performed, for example, by any of the processes noted in the above referenced patent application and/or Healy et al., U.S. Patent Application 61/314,044, entitled "3D GLASSES WASHING AND STORAGE RACK," the contents of which are incorporated herein in their entirety for all purposes.

If the glasses are re-usable (e.g., pass quality testing (step 350)), they are made available for re-use. As noted in the flow chart, scanning may occur on cleaned glasses in trays (e.g., as part of step 310), prior to shipment. Alternatively, with appropriate data connections, scanning may occur during shipment (e.g., while in a delivery truck), at the time of delivery to theaters, or at theaters. The examples provided by process 3000 being exemplary. In addition, the process may be modified in content or order of steps, but preferably scans are made at a convenient time to assure inventory control and note shrinkage and or other QA issues that occur with any particular pair of glasses or sets of glasses.

Figure 4:
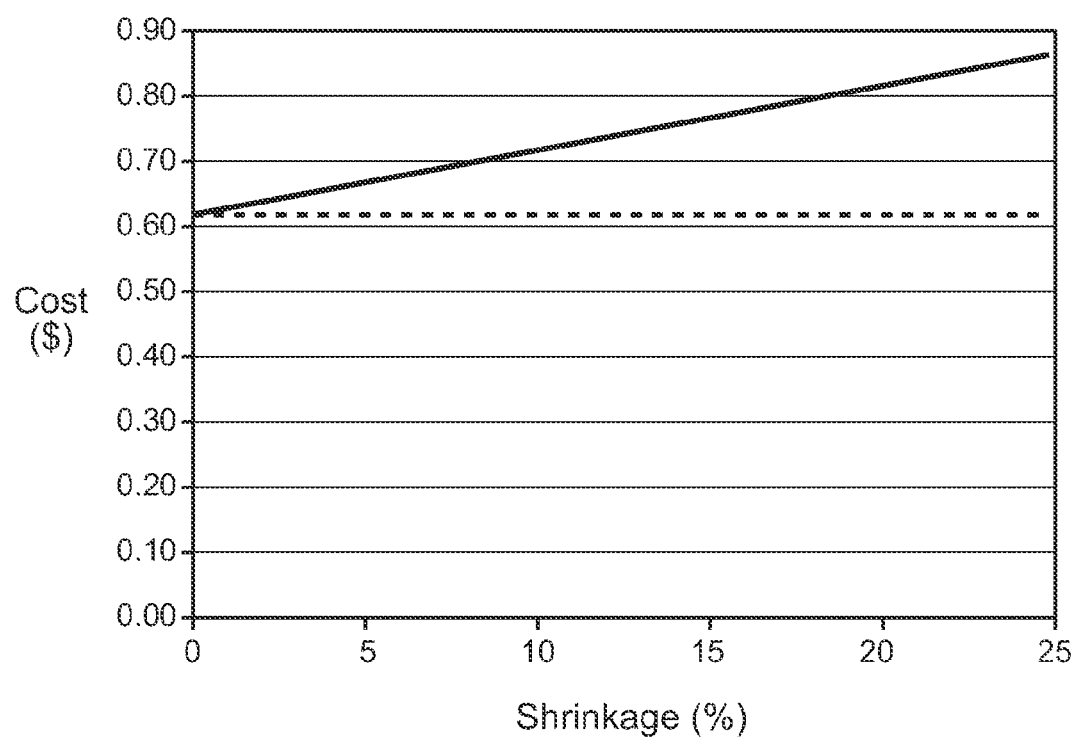
FIG. 4 is a graph illustrating a cost analysis/targets for 3D glasses rental operations according to an embodiment of the present invention.
Figure 5A:
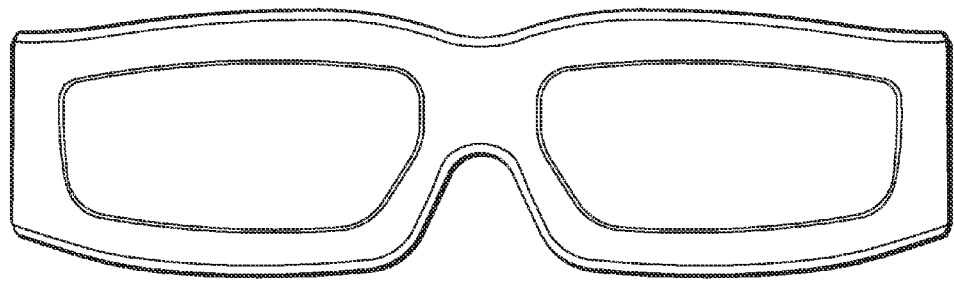
Figure 5B:
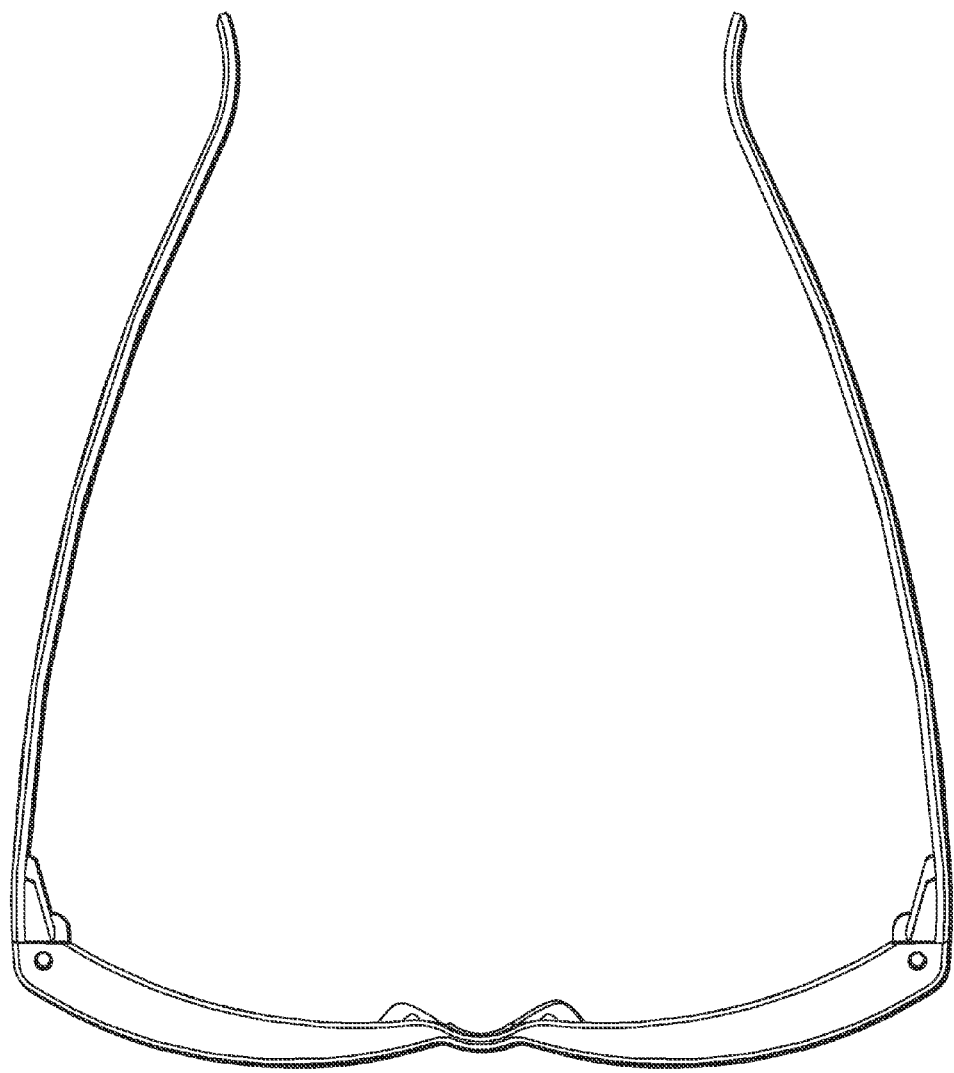

FIG. 4 is a graph illustrating a cost analysis/targets 400 for 3D glasses rental operations according to an embodiment of the present invention. For exemplary purposes, the graph shows a relatively flat Vendor Profitability, which provides a price where a vendor providing 3D glasses to theaters will remain profitable absent higher than projected (i.e., the vendor profitability point includes normal wear & tear shrinkage). As shrinkage increases, the cost of the shrinkage is billed back to the theaters that cause the shrinkage which allows the vendor to maintain the same level of profitability. The causation of the shrinkage is determined by evaluation and inventory controls set in place using the RFID scanning.

Along these same lines, the process 300 may be modified to include any of the following:

A vendor or partner would scan the serial number of every pair of clean 3D glasses being shipped to a theater and automatically reconcile used (dirty) 3D glasses being received back from the theater for washing. This would eliminate the need to manually count product exiting and entering the cleaning facility and would allow for automatic billing, especially for product shrinkage.

Data gathered may be utilized by the vendor to predict over/under shrinkage rates thus triggering increased or decreases in orders for new glasses. Optimizing the 3D glasses supply chain.

Data gathered may be used for information gathering on the 3D glasses usage by theater, theater chain, region, state, city, country, geographical region, etc. This information could highlight areas where shrinkage is particularly high or low and allow the vendor to dynamically adjust prices to ensure profitability and competitive edge. It would also provide the vendor an opportunity to target installations with marketing campaigns to lower shrinkage (utilizing an environmental story for example) if shrinkage rates were impacting our business.

Data gathered may also be used to predict usage patterns for movies from particular directors, studios or distributors, and account for the effects of seasons or weather, thus assisting the Operations team in planning up coming events, such as some of the recent block buster 3D titles.

Data gathered may also be used to support a business model where a vendor or partner provides a sliding cost scale for theaters, by automatically rewarding theaters with low shrinkage and billing those with high shrinkage—see FIG. 4, for example. In one embodiment higher shrinkage theaters would pay more per pair of glasses rented. In another embodiment a higher price is paid by each theater with a rebate given back to the theaters that increases with lower shrinkage.

There is also an inherent incentive for each theater manager to keep shrinkage low. As theaters roll up their 3D rental finance numbers to their corporate office, theaters with high shrinkage would have higher operating costs which may trigger their corporate office to investigate, setting internal theater targets for their managers. This would benefit the vendor through lower stock replenishment rates.

This would be an automated process for the vendor or partner, keeping costs down, and minimizing inventory Linear equations may be utilized to determine shrinkage costs per theater. For example, the formula:

$$Y-(0.1)X=0.60;$$

where Y=theater cost, and X=shrinkage rate may be used for a minimum profit margin of $0.60.

For example, a theater cost of $0.60 occurs with zero shrinkage, and a theater cost of $0.85 occurs if shrinkage is 25%. Actual numbers for minimal profit margin and cost of shrinkage may take any form and may be adjusted based on different designs and quality of the glasses, washing equipment, chemicals, etc. Rather than calculating profit, the data gathered may also be use to reduce inventory levels to the minimum required for full service to theaters under contract for rental glasses.

The entire process and results of the invention helps maintain a positive environmental effect over disposable glasses by lowering the number of glasses needed to a minimum, thus reducing manufacturing, transportation, lower damage means less glasses going to landfill.

There are inexpensive scanners on the market today that can scan approx 800 RFID tags in about 2-3 seconds. This could be an in-line incoming and outgoing process.

Data gather could also be used to identify anomalies in product performance. For example, if the data showed an abnormally high failure rate in the field, say 3D glasses frames were braking, we could correlate 3D glasses serial numbers and potentially identify a quality or reliability issue with a batch and look to recover cost from the 3D glasses manufacturer.

Functionalities could be added to help improving theater management. For example, collecting data on actual occupied seats per screen at a multi-screen theater or issuing monetary credits to the 3D glasses so that it could be used by patrons to purchase concessions before, during and after each show.

FIGS. 5A-5D are multi-view drawings of 3D glasses with RFID illustrating antenna placement installation options according to embodiments of the present invention. For example, possible antenna surfaces include either left or right temples, and lens frames.

Figure 6:
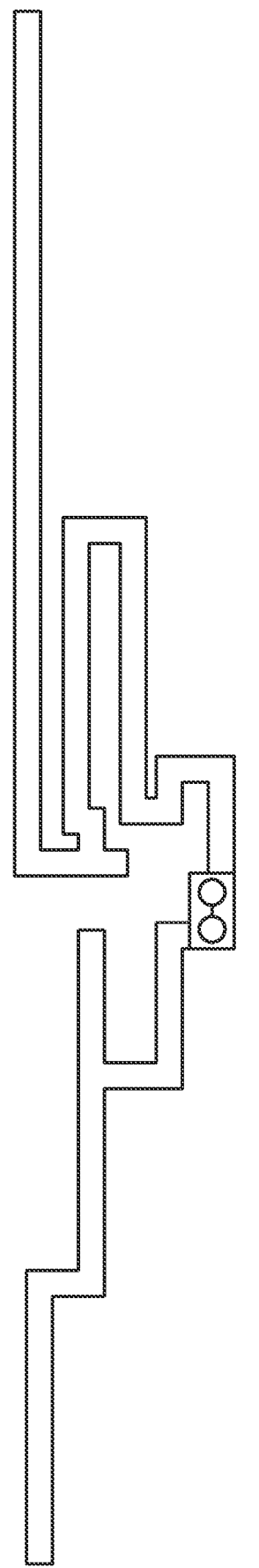
FIG. 6 is a drawing illustrating antenna placement options according to embodiments of the present invention.

FIG. 6 is a drawing illustrating antenna design options according to embodiments of the present invention. Antenna placement could be in any of the noted locations or any combination of locations, including a same location as where the RFID chip is embedded, or the location of RFID embedding and another frame member of the glasses, or all frame members of the glasses. Preferable locations include the right temple (e.g., see conductor 630 on right temple or frame), lens frames (e.g., see conductor 630 imbedded/insert molded (for example) in glasses frame), and left temple (e.g., see conductor 640 which could be part of left temple). For antenna conductors that may straddle frame parts, a conductive hinge between the frame parts may also form part of the conductor (e.g., a hinge between a temple part of the frame and lens area of the frame may be utilized to connect conductors in the temple with conductors in the lens area of the frame). Regardless of location, the antenna/conductor interfaces or provides for the transmission of signals to/from RFID chip 610.

In one embodiment the conductor, or antenna, has greater gain than normally utilized with RFID or similar wireless devices, extending the range at which glasses may be scanned. Such an improvement may be utilized to allow tracking of glasses within a theater, or other use monitoring. In one embodiment, scanners in the theater may locate general seating locations (or exact depending on accuracy). In the event complaints are received on viewing quality, the patrons seating location along with the glasses utilized may be logged and utilized for follow-up review related to either the glasses or other theater operations.

Although the present invention has been described herein with reference to 3D glasses and particularly a rental model for 3D glasses, the devices and processes of the present invention may be applied to other rentable items having similar qualities. In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing an RFID tag, any other equivalent device, such as a wireless ID transmitter, or other device having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to RFIDs, scanners, anti-shoplifting devices, trays, delivery methods, accounting methods or practices, other rental models, etc should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, capturing IDs of devices for inventory, capturing and placing data related to 3D glasses, trays, and usage thereof in a database and analyzing the data to identify usage trends, shrinkage, and other data related to the efficiency or quality of the devices, particularly as it relates to 3D glasses and their quality for 3D viewing and continued re-use, and the display, storage, or communication of results according to the processes of the present invention.

The present invention may suitably comprise, consist of, or consist essentially of, any of element (the various parts or features of the invention and their equivalents as described herein). Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of claims to be included in a subsequently filed utility patent application, the invention may be practiced otherwise than as specifically described herein.

Figure 7:
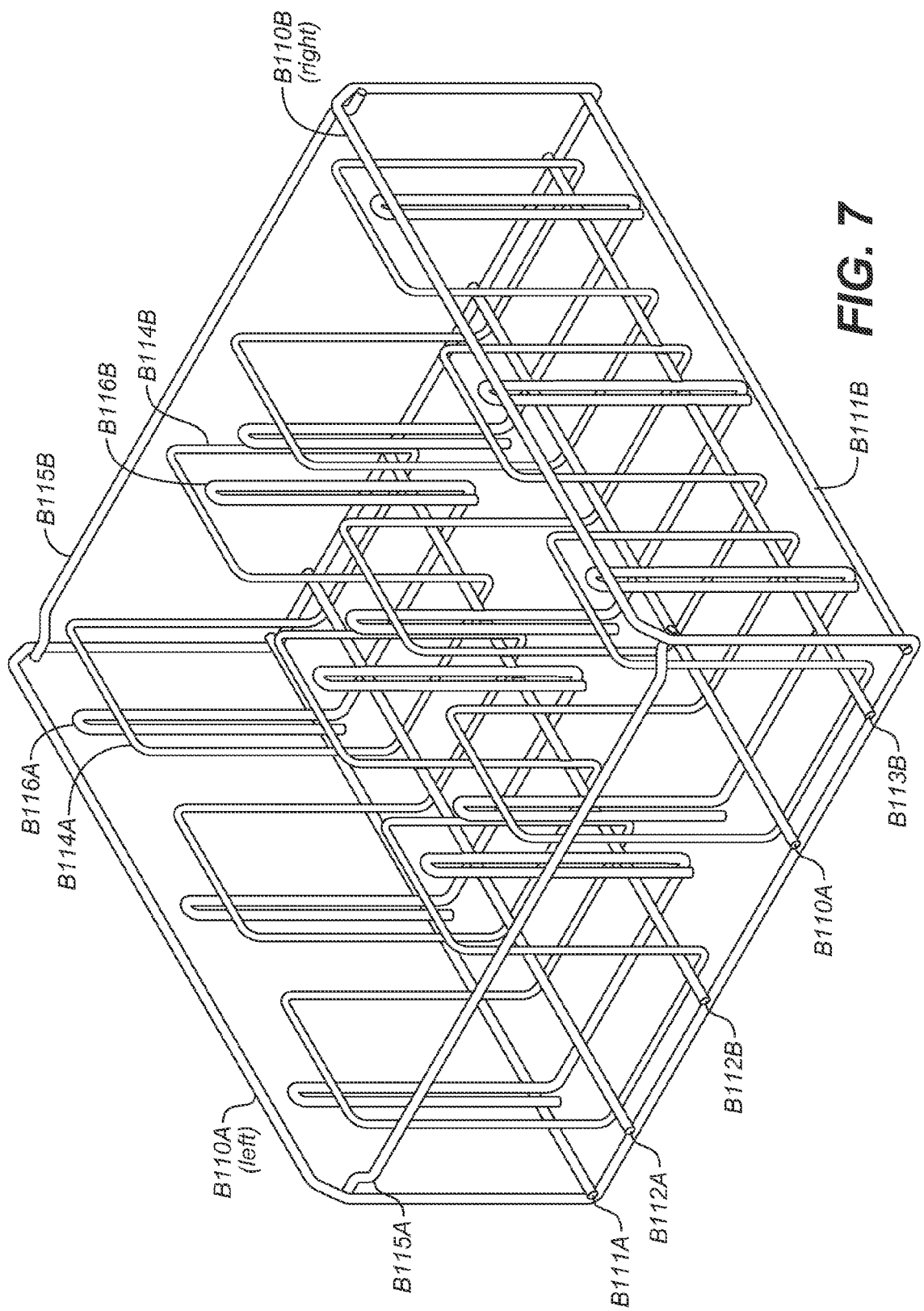
FIG. 7 is a drawing of a washing/storage rack according to an embodiment of the present invention.

Referring again to the drawings, and more particularly to FIG. 7 thereof, there is illustrated a glasses storage and washing rack B100 according to an embodiment of the present invention.

The storage and washing rack B100 includes features that enable more efficient washing, drying, storage, distribution, and collection of glasses. The storage and washing rack includes mechanisms to hold glasses in place via a tray slide-on/slide-off design. Preferably, the glasses stacked and nested into each other increasing the number of glasses per tray over existing glass washing trays. The glasses are held vertically in position to maximize both washing and drying capability and are positioned so that excess water is easily wiped away (either manually or via automated mechanisms). An interlocking design for washing and stacking of trays is also provided.

Part number B110 (1) name: handles, left (B110A) and right (B110B) (2) function: (a) to hand carry the rack; (b) to lock the upper rack in position horizontally and vertically for stacking (in conjunction with the two bottom parallel welded support rods—B111A, B111B). (3) structural description: ¼" diameter stainless steel rod formed into a left and right handle as part of a frame which supports two formed ¼ diameter stainless steel welded support rods on the bottom parallel to the handles (B111A, B111B) and two formed ¼" diameter stainless steel welded support rods on top perpendicular to the handles (B115A, B115B). (4) Other devices that may be utilized: This rack is designed to work with a commercial dishwasher with an automatic detergent, rinse agent and sanitizer dispenser and an in-line water heater.

Part number B112A, B112B, B113A, B114B (1) name: glasses stack support rod. (2) function: (a) to position and support the individual stacks of glasses and welded glasses positioning structures (B114, B116). (b) to position and support three stacks of glasses welded in position as a subassembly onto the rack frame. Two subassemblies are welded to the frame (left subassembly: B112A, B112B, right subassembly B113A, B113B) as shown parallel to the handles (B110A, B110B). (3) structural description: straight ¼" diameter stainless steel rods 19.5" long.

Part number B114A, B114B is a glasses stack temple support frame. The glasses temple support frame positions the glasses in the stack by holding a part of the frames (e.g., the temple area, inside frame front where temples connect to frame front, or other locations) of the glasses in conjunction with the nose support rods (B116A, B116B). Each glasses stack has a left (B114A-116A) and right (B114B-116B) side where glasses are interleaved as they are stacked.

The glasses temple support frame may provide support for another rack stacked on top by creating a support frame perpendicular to the nose support rod of the rack stacked on top of the support frame which prevents the stacked rack from touching or damaging the stack of glasses below the support frame. The glasses temple support frame may be constructed, for example, as a frame welded from 3/16" diameter stainless steel rod formed to provide a left and right glasses stack support structure with a left and right side.

Part number B116A, B116B illustrate glasses stack nose support rods. The nose support rods position the glasses in the stack by holding the nose area of the glasses in conjunction with the temple support frame (B114A, B114B) and support a rack when stacked on top of another rack for washing, drying, storage, etc. by providing a support rod perpendicular to the temple support frame (B114A, B114B) of the lower rack. Each rack may have, for example, as illustrated, 12 support points (2 per each glasses stack temple support frame).

The nose support rods may be formed from ¼" diameter stainless steel rod welded in position onto the glasses stack support rods, in, for example, 3 places per subassembly (left B112A, B112B and right B113A, B113B) for a total of 6 per rack. When welded into position, the glasses stack nose support rod provides approximately a ½" gap between the nose support rod and the temple support frame on each side which allows loading and stacking of the glasses. The sizing of the gap may vary, for example, depending on a design of the glasses.

Among the other advantages and features described herein, the present invention provides for more efficient operation of theaters equipped with re-usable glasses that are washed between uses. Various embodiments provide for a reduced number of trays needed per theater deployment and a lower initial investment cost for the theatres. Increased storage and washing capacities (e.g., by increasing the number of 3D glasses that can be held per tray and thereby increases the number of glasses washed per cycle). The invention is environmentally more friendly that current systems by using less energy, less chemicals, less water, less employee time needed for washing (the invention is easier to load and unload compared to existing systems). The invention reduces the amount of storage area that is needed between movies.

The invention is more efficient and does a better job of washing than current systems. By maintaining the glass lenses in a vertically oriented position, less spotting occurs from washing operations. Removal of excess water is facilitated not only by maintaining the glasses oriented for easy wiping, but also the glasses are held securely allowing employees to shake the trays to dislodge larger amounts of residual water and then wipe down if/as necessary.

Manufacturing of the invention is also environmentally friendly compared to existing systems, as the trays according to the present invention require less welding, less grinding, less materials (e.g., steel wire), and that less trays are needed, less shipping and packaging to fully equip a theater (or an outsource washing company).

Figure 8A:
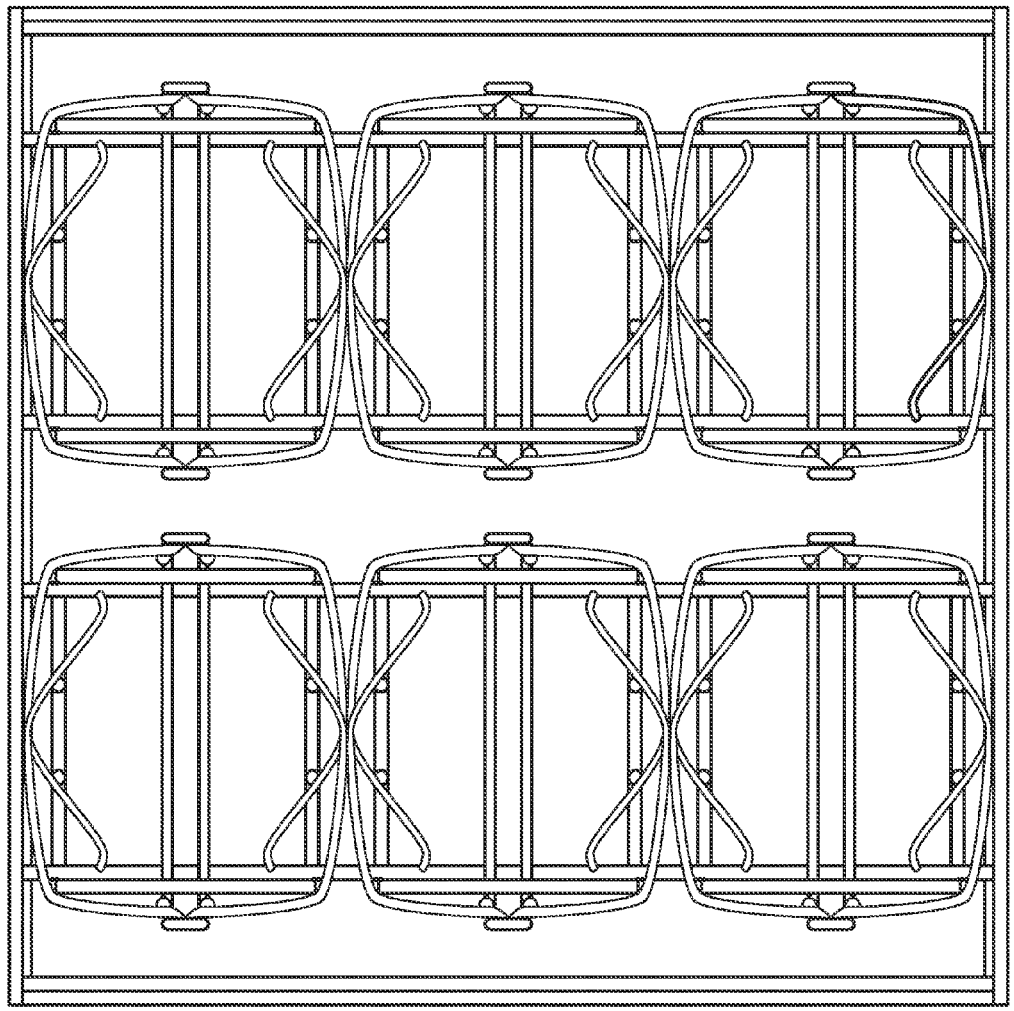
FIGS. 8A-8C are 3 view drawings of a washing/storage rack loaded with stacked and nested 3D glasses according to an embodiment of the present invention.
Figure 8B:
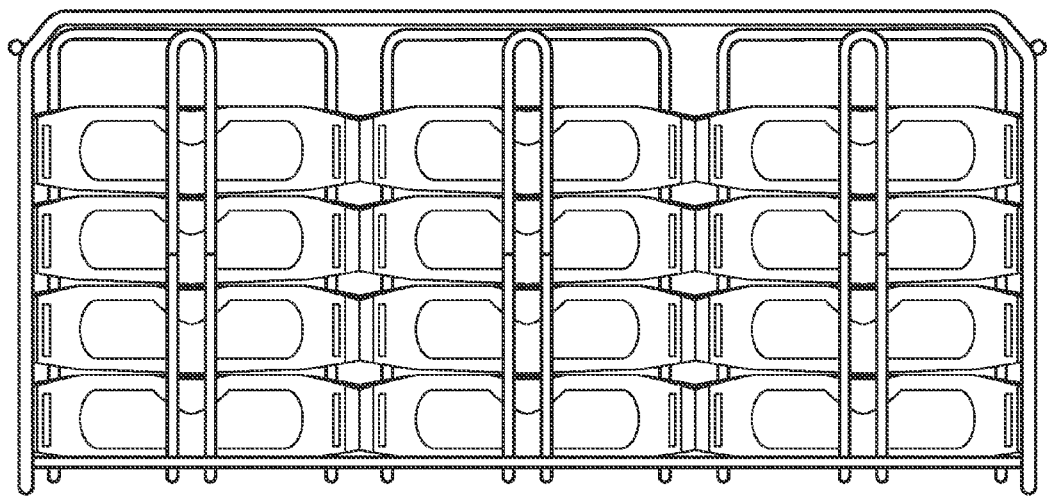
Figure 8C:
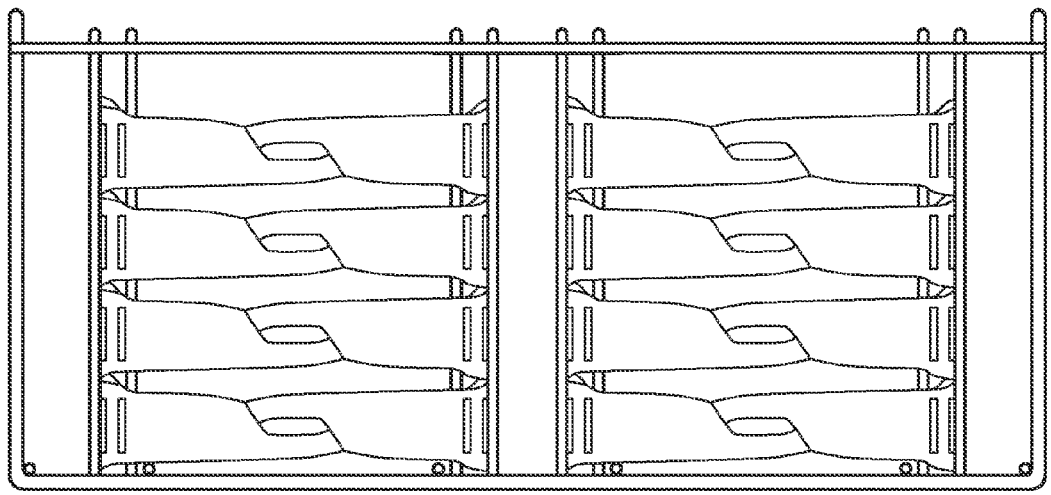

FIGS. 8A-8C are 3 view drawings of a washing/storage rack loaded with stacked and nested 3D glasses according to an embodiment of the present invention. A top view B210 illustrates the glasses held vertically and stacked into columns. Each pair of glasses is held between a nose support and temple support member. In each column, a first stack of glasses is held by a first set of nose and temple support members and a second stack of glasses are held by a second set of nose and temple support members for each column. The first and second stacks of glasses are held facing opposite directions forming the illustrated columns.

Front view B220 illustrates one side of three different columns. The lenses of each column are held vertically (improving run-off which reduces spotting and improving access and efficiency of any wide drying that may be necessary or desirable while the glasses are in the rack).

Side view B230 illustrates nesting and interlocking that also improves the efficiency of the rack according to the present invention. The frames of the glasses are nested as the temples of one stack fit within the temples of another stack. The frames of the glasses are interlocked as the temples of one frame fit inside the temples of a second frame whose temples fit inside the first frame. Such interlocking is further facilitated by interlocking at a curvature of the glass frames temples.

Figure 9:
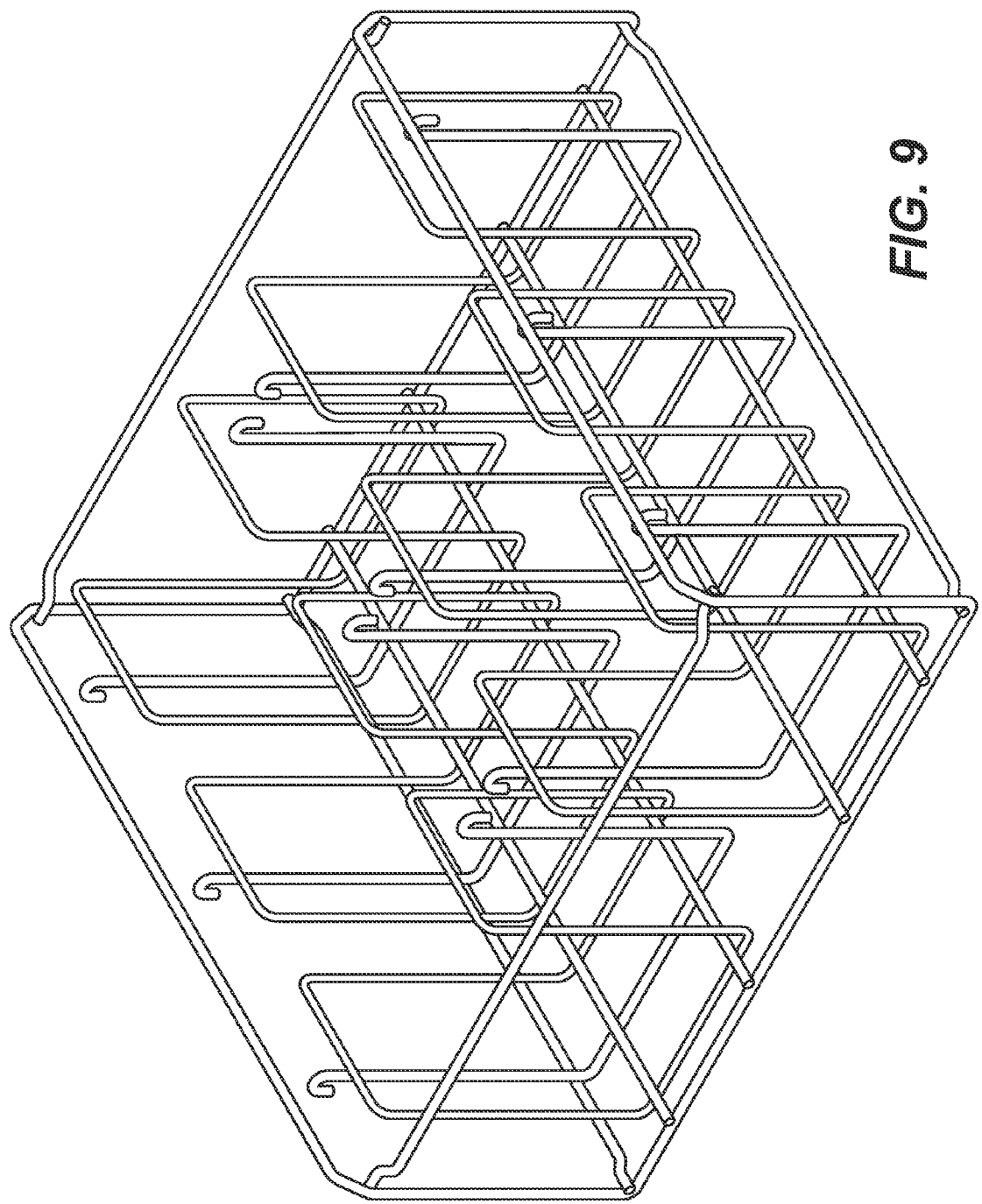
FIG. 9 is a drawing of a washing/storage rack according to an embodiment of the present invention.

FIG. 9 is a drawing of a washing/storage rack according to another embodiment of the present invention. In this embodiment the nose frame members are a single wire having a bend which facilitates fitting the glasses into the gap between the nose frame member and temple frame support member. The temple support member B314 may specified, for example, as Ø4.76[0.19] SS304 6-PL WELDED 30-PL. Handle B315 may be more sturdily constructed by, for example, as Ø6.35 [0.25] SS304 15-PL WELDED 29 PL.

Figure 10:
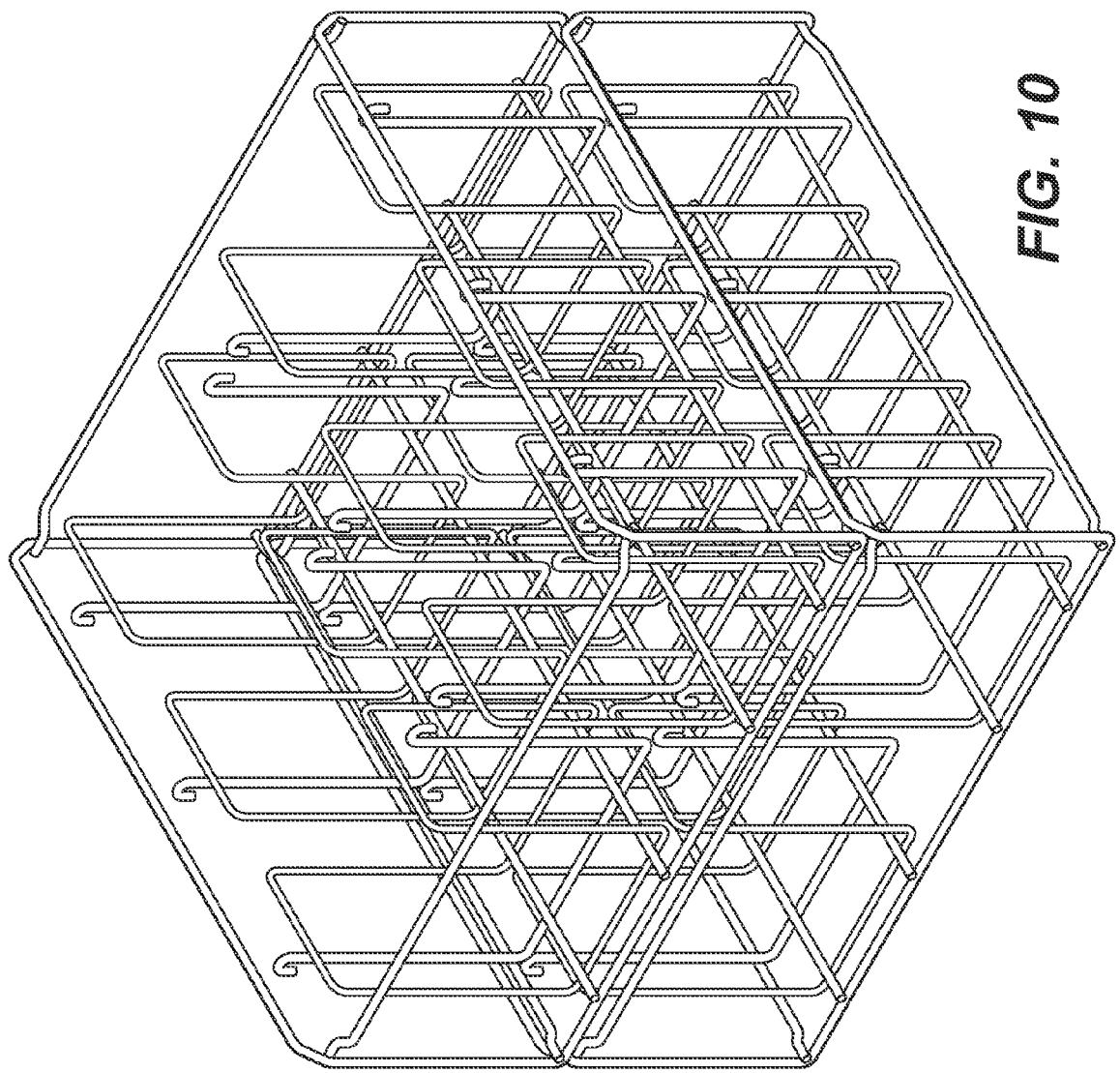
FIG. 10 is a drawing of a pair of stacked washing/storage racks according to an embodiment of the present invention.

FIG. 10 is a drawing of a pair of stacked washing/storage racks according to an embodiment of the present invention. In this manner, the racks/trays provide a highly efficient storage system whose capacity is easily varied by adding or removing racks. The efficiency of the stacked racks is also utilized in washing machine where the stacks are simply stacked as loaded into the machine or washing conveyor, or may be pre-stacked and loaded as a unit of N racks at the same time.

Figure 11:
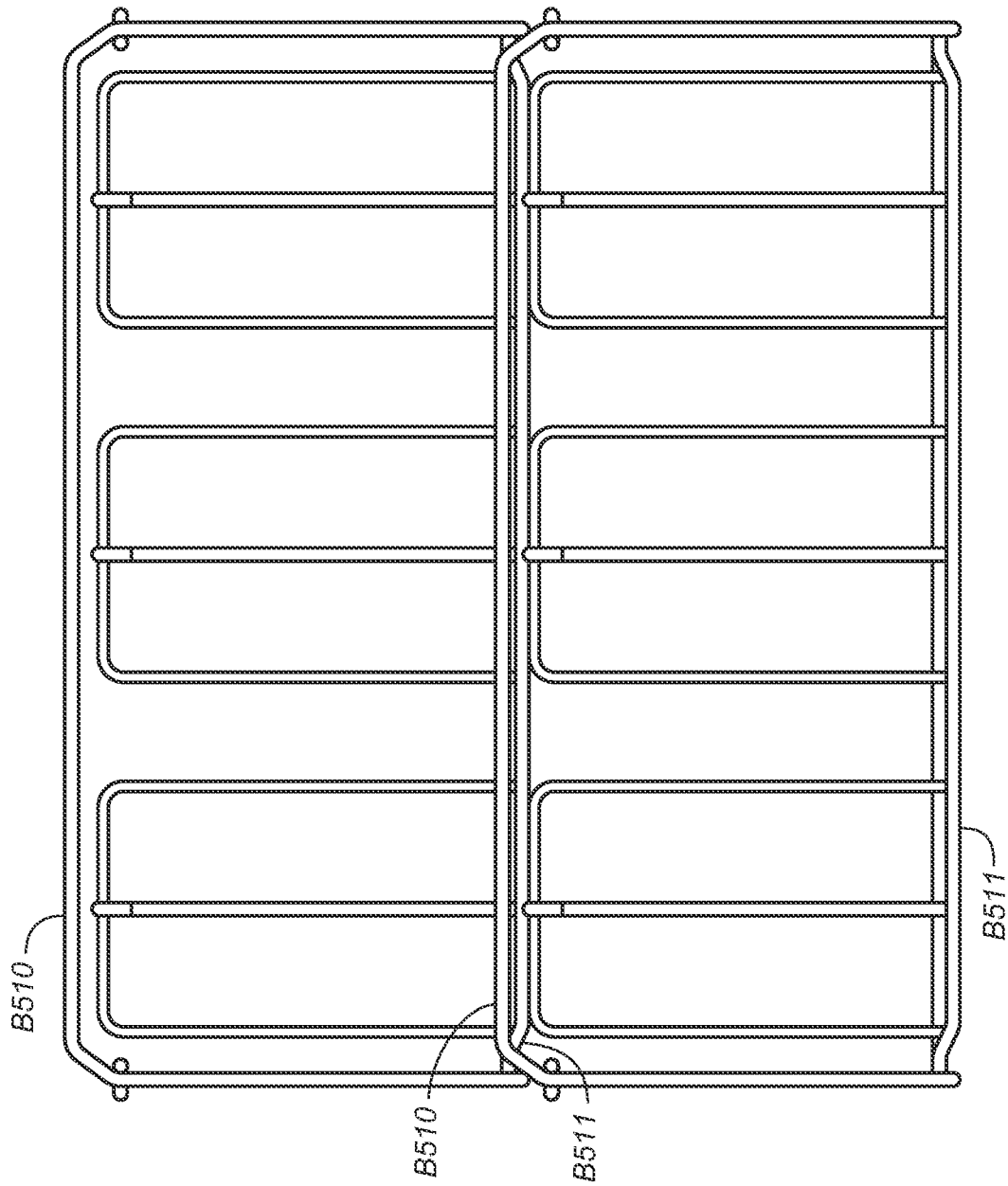
FIG. 11 is a drawing of a front view of the stacked washing/storage racks of FIG. 10 according to the present invention.
Figure 12:
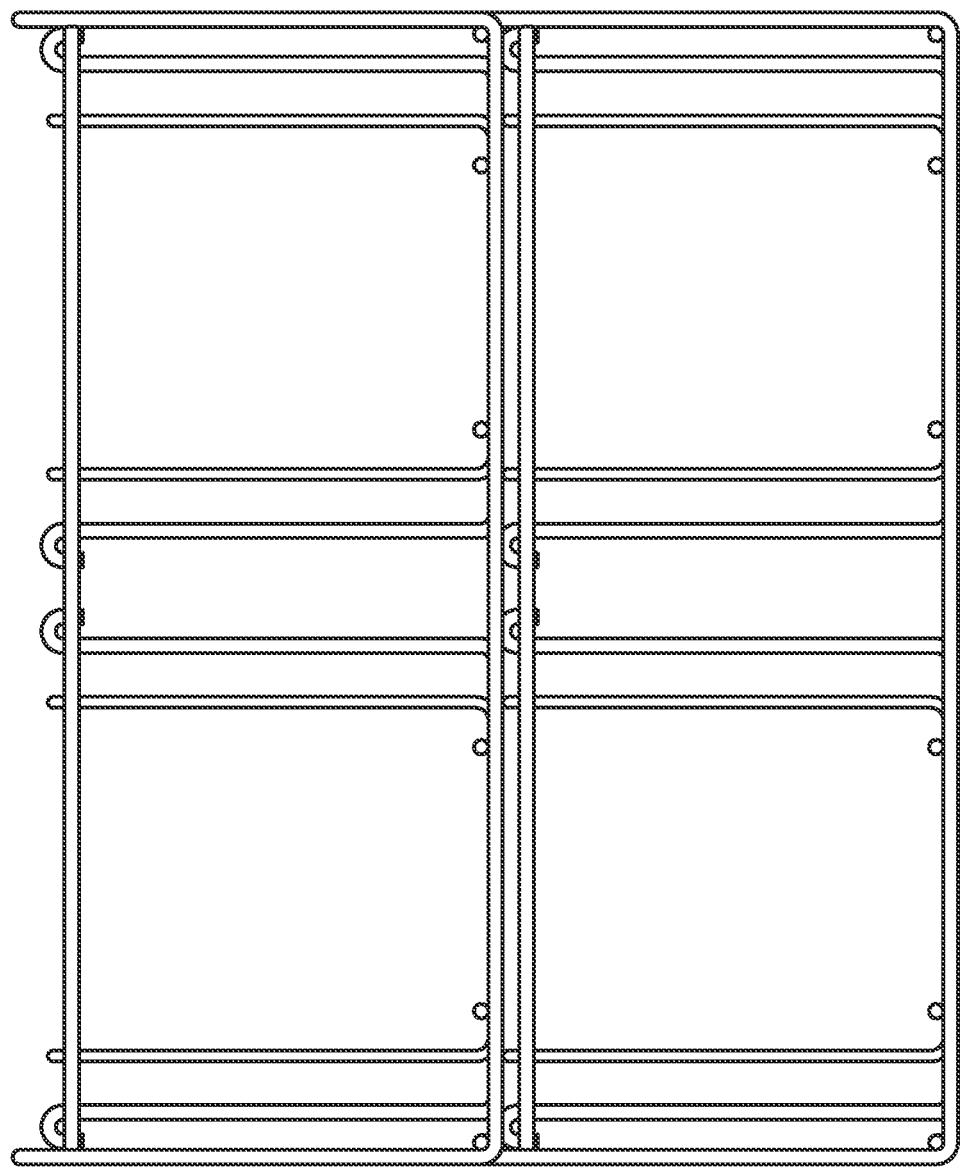
FIG. 12 is a drawing of a side view of the stacked washing/storage racks of FIG. 10 according to the present invention.

FIG. 11 is a drawing of a front view of the stacked washing/storage racks of FIG. 10 according to the present invention. Each washing/storage rack (or tray) has handles B510 and support rails B511. As shown, the handles B510 of the bottom tray interlock with support rails B511 of the upper tray. Interlocking of the racks provides support and security when the trays are stacked in storage, when washing, during shipment or other transport, and/or when distributing/collecting glasses. Other configuration including special additional parts may be utilized to facilitate interlocking of the trays, but preferably the interlocking is accomplished through the orientation of existing frame members, as shown here in exemplary form, to reduce parts and complexity. FIG. 12 provides a side view of the stacked washing/storage racks of FIG. 10 according to the present invention.

Figure 13:
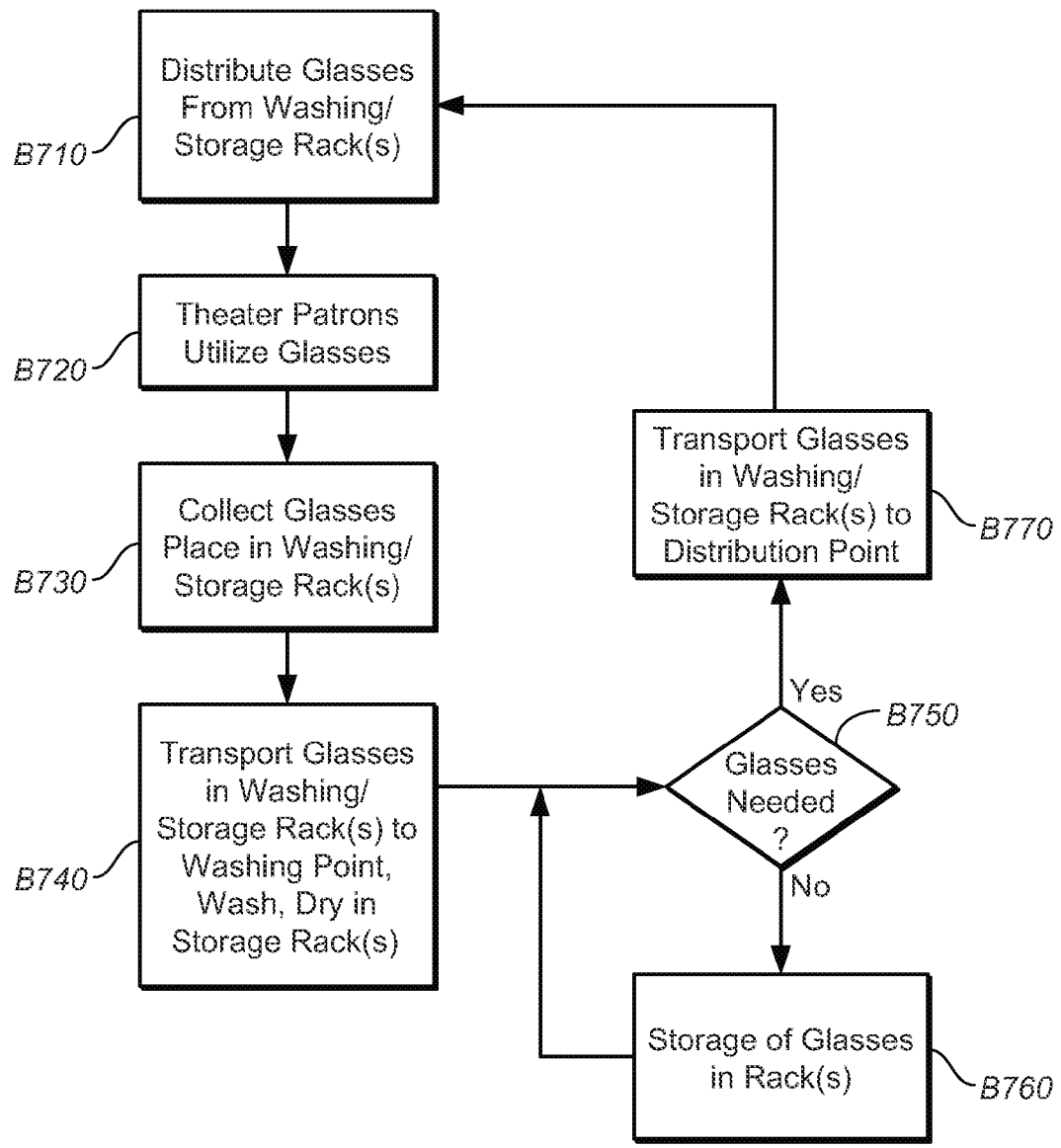
FIG. 13 is an exemplary process for distributing, collecting, washing, and storing 3D glasses in a theater operation according to an embodiment of the present invention.
Figure 14A:
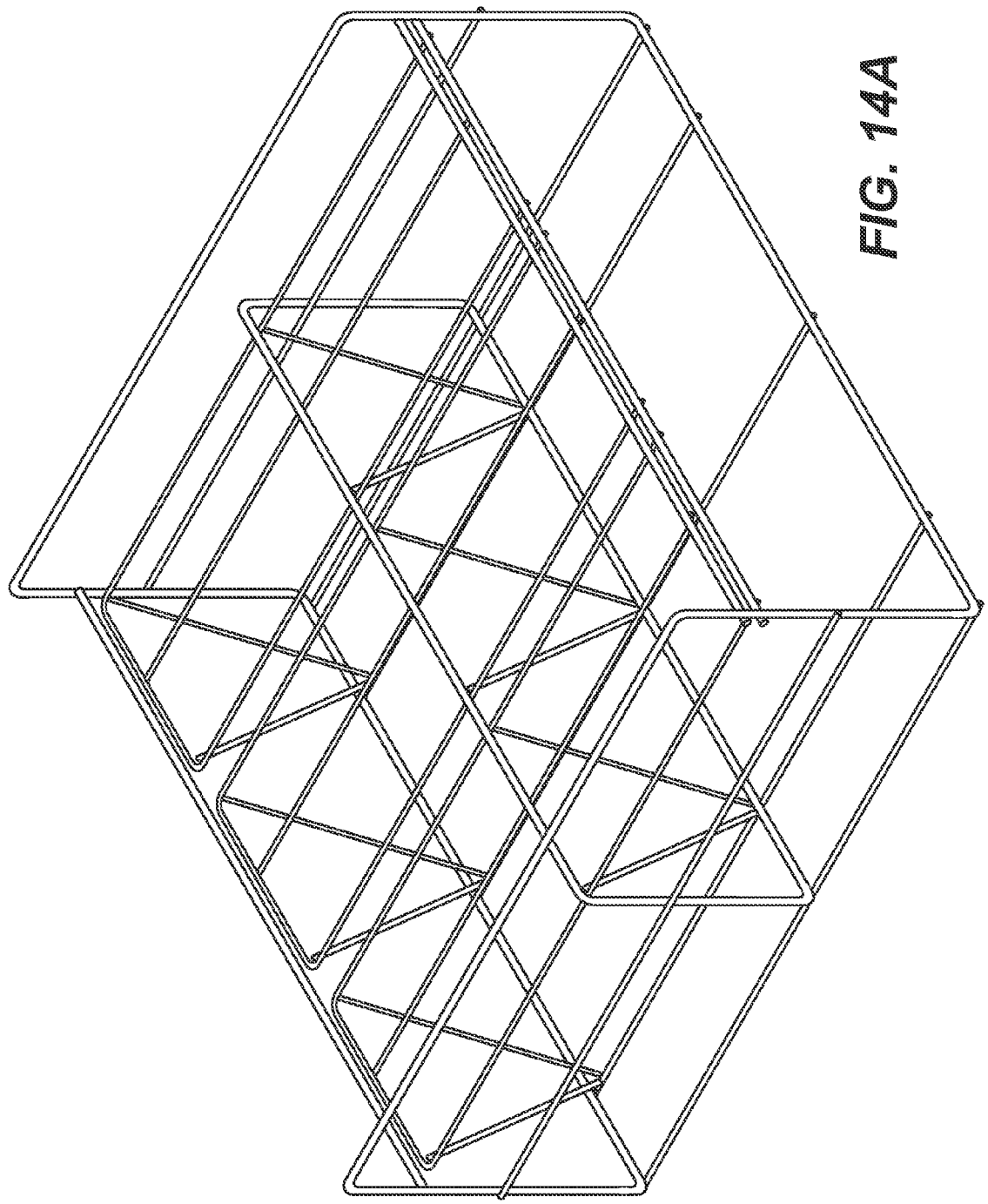
FIGS. 14A-14D are drawing views of yet another washing/storage rack (tray) design according to an embodiment of the present invention.
Figure 14B:
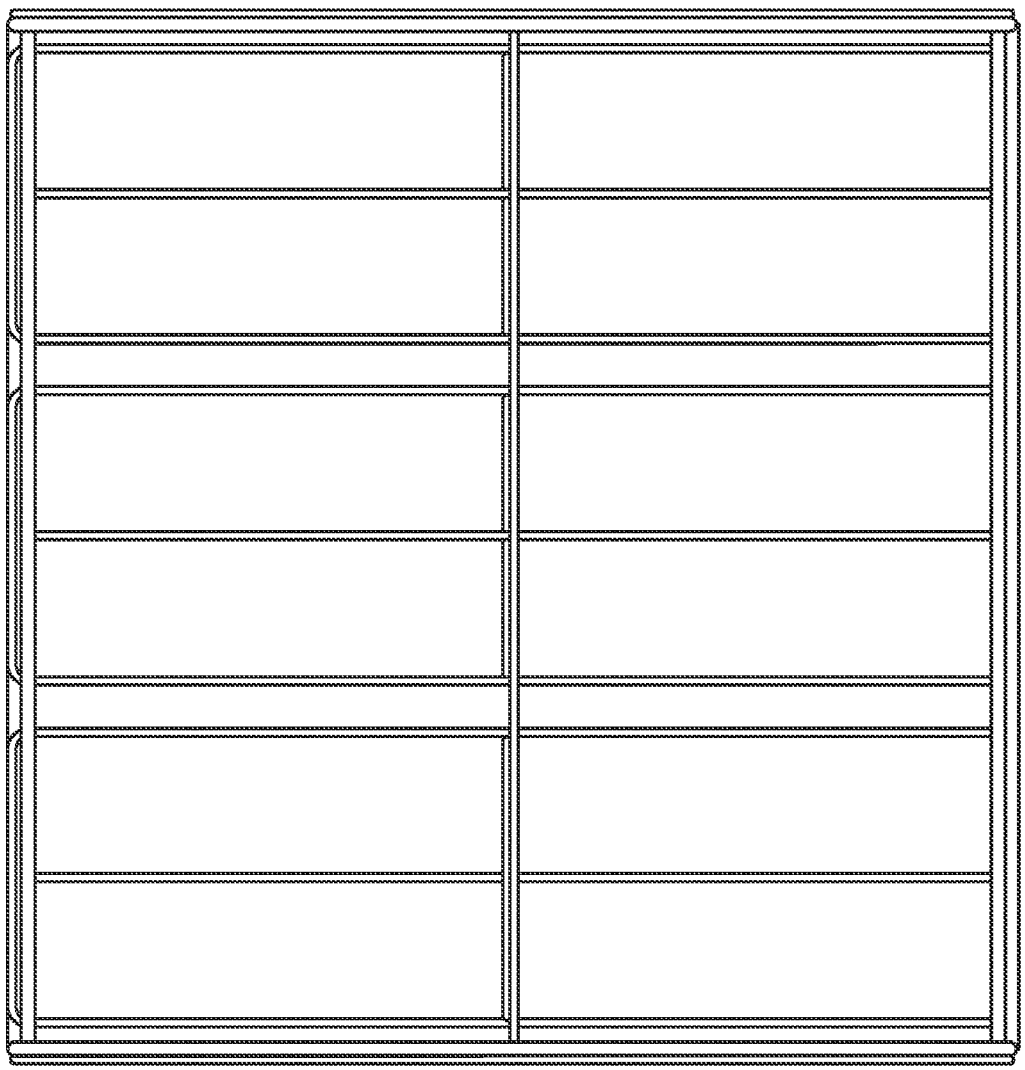
Figure 14C:
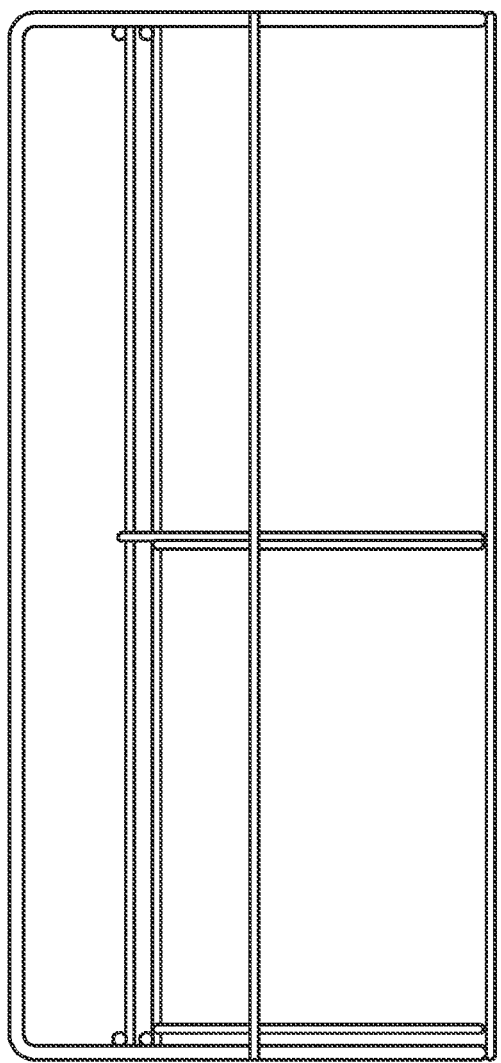
Figure 14D:
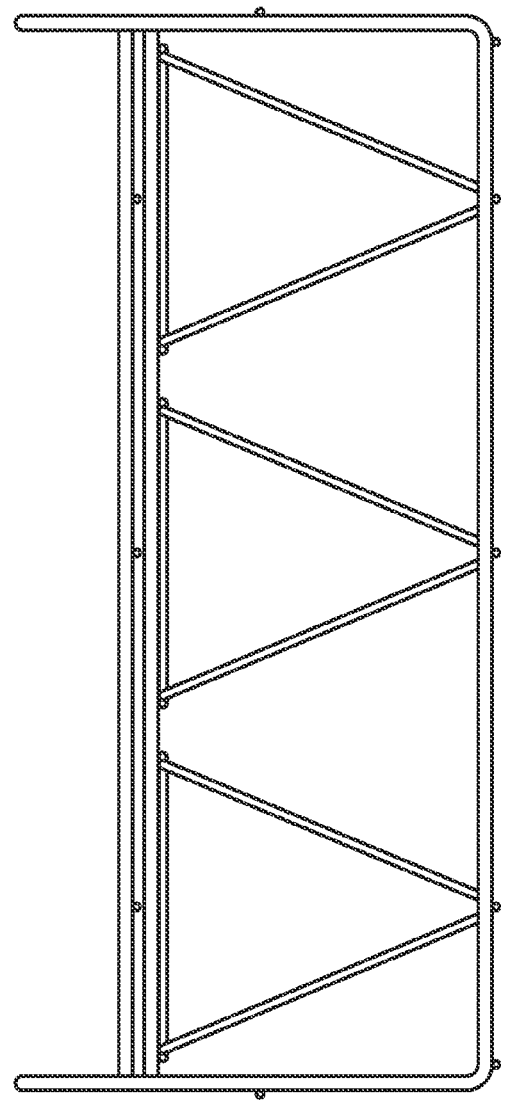
Figure 15C:
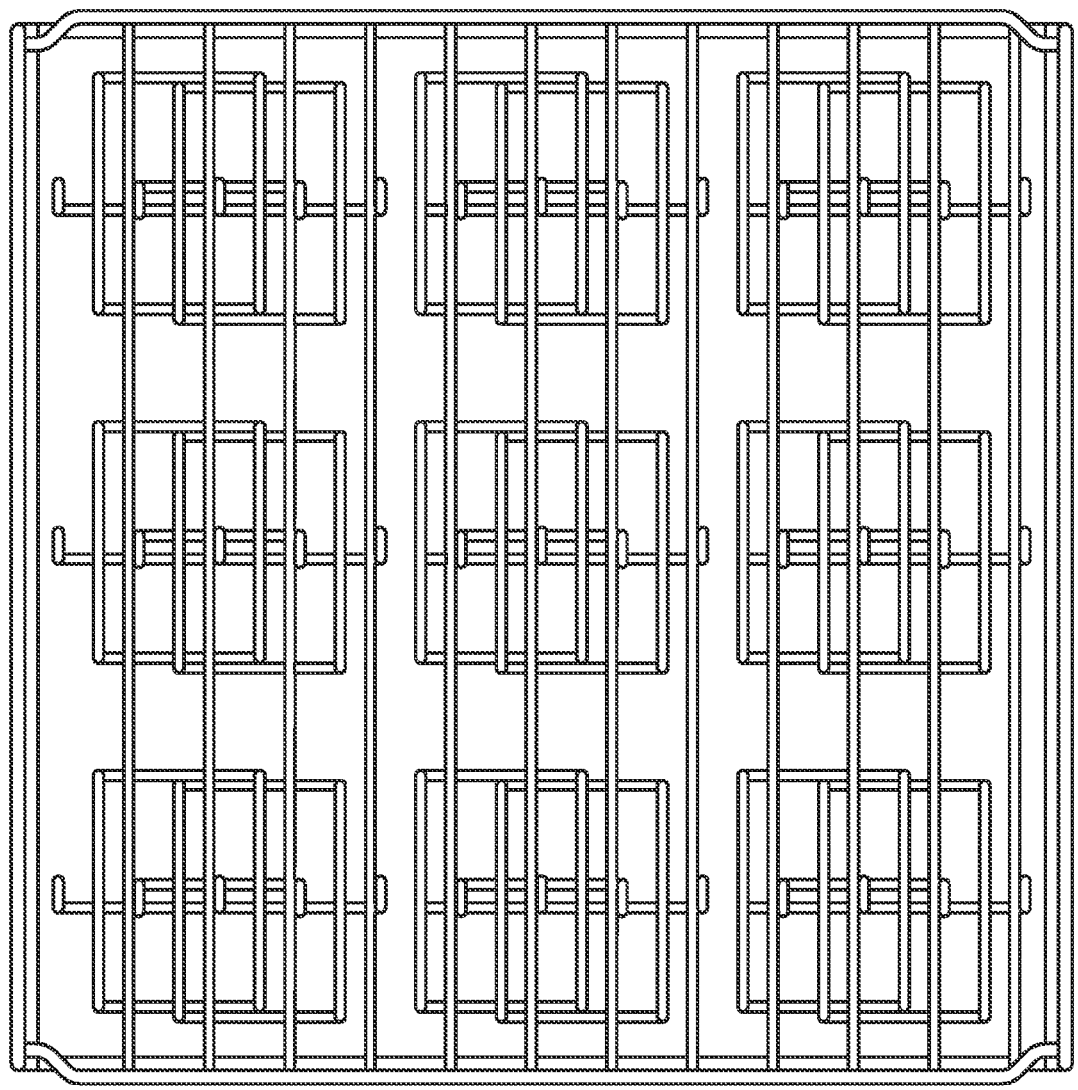

FIG. 13 is an exemplary process for distributing, collecting, washing, and storing 3D glasses in a theater operation according to an embodiment of the present invention. The process can be a continuous loop. At step B710 Distribute Glasses From Washing/Storage Rack(s), glasses in a washing/storage rack are distributed to patrons/customers of, for example, a 3D theater. The glasses in the rack may be positioned, for example, behind a sales counter of the theater or at a distribution/collection point in/near the theater. At step B720, the theater patron utilizes the glasses to watch a feature film or other presentation. Other than theaters and feature films, the system may also be implemented for teleconferencing, viewing remote unmanned activities (planet or space exploration, UAVs, etc), or other activities, sporting events in large stadiums with screens capable of displaying 3D (e.g. NFL's new Dallas Cowboys stadium) or NBA's newer arenas, airliners equipped with appropriate displays, or other activities.

At step B730, the theater patrons (or other user) return the glasses to a collection point where they are loaded into a washing/storage rack. The glasses remain in the washing storage rack through transport, washing, drying, and/or storage until re-utilized as needed (e.g., steps B740-B770, leading back to distribution, step B710). The washing, drying, and/or storage necessary may be implemented entirely within the theater or other activity operations. Alternatively, washing of the glasses may be performed by an outside contractor that either picks up glasses or receives them via shipment (e.g., FED-EX/UPS, etc.). The glasses remain in the storage/washing rack throughout shipment, washing, and re-delivery (as needed) to the theater or other activities operation. Storing the glasses may be transitory storage such as, for example, storage between shows or waiting for washing, and/or longer term storage at a theater or in a warehouse (e.g., washing contractors warehouse, wholesale distribution warehouse, vendor's showroom or stockroom, etc.).

In yet another embodiment, the glasses are provided to the theater/venue on a rental model where, for example, the glasses are not owned by the venue, but are rented as needed. The rental model could, for example, follow a similar process flow as illustrated by FIG. 13 but the theater/venue would pay per use/wash of the glasses. In such a model, the theater would not have the expense of purchasing the glasses.

In the various rental, contractor, and/or theater operations models, the glasses remain in the storage/washing rack throughout shipment, washing, and re-delivery (as needed) to the theater or other activities operation. Storing the glasses may be transitory storage such as, for example, storage between shows or waiting for washing, and/or longer term storage at a theater or in a warehouse (e.g., washing contractors warehouse, wholesale distribution warehouse, vendor's showroom or stockroom, etc.).

FIGS. 14A-14D are drawing views of yet another washing/storage rack (tray) design according to an embodiment of the present invention.

FIGS. 15A-15D are drawing views of a rack B900 according to another embodiment of the present invention, including the perspective view, a side view B910, a front view B920, and a top view B930. The support members for holding glasses are arranged so that the glasses are stacked vertically in a folded position. The support members are arranged such that the stacks of glasses are close together. As shown, a nose support rod and a temple support frame are utilized for each stack. This embodiment has advantages in packing and distribution in that the frame arms are not interlocked which allows for more efficient packing and potentially distribution. In one embodiment, the rental model is implemented by an existing theater service organization (e.g., popcorn, candy, film distribution entities) that currently have storage and transportation networks to theaters and would be ideally positioned to pick up and carry a glasses rental model or business plan. This embodiment is also better suited for contractor and rental models according to the present invention.

Figure 16B:
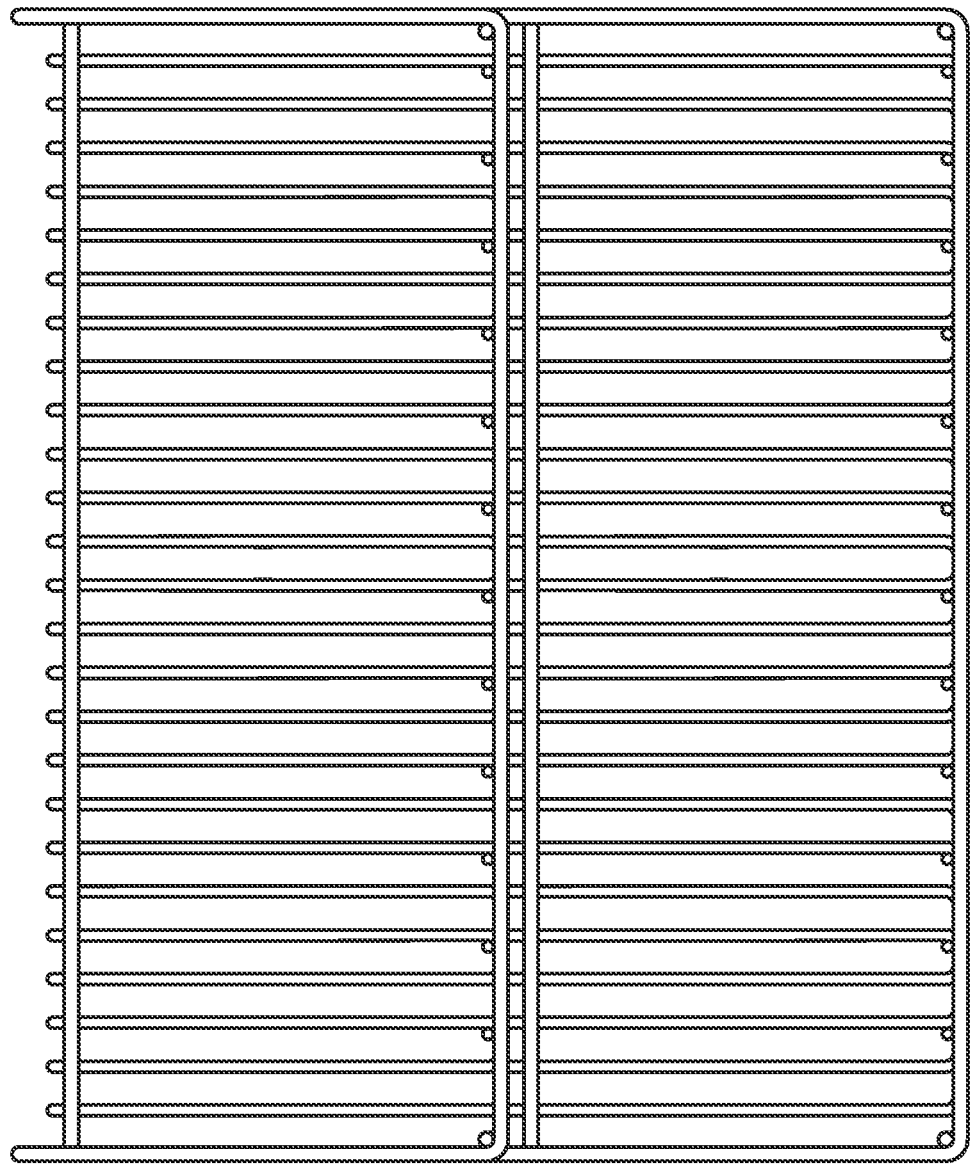
Figure 17A:
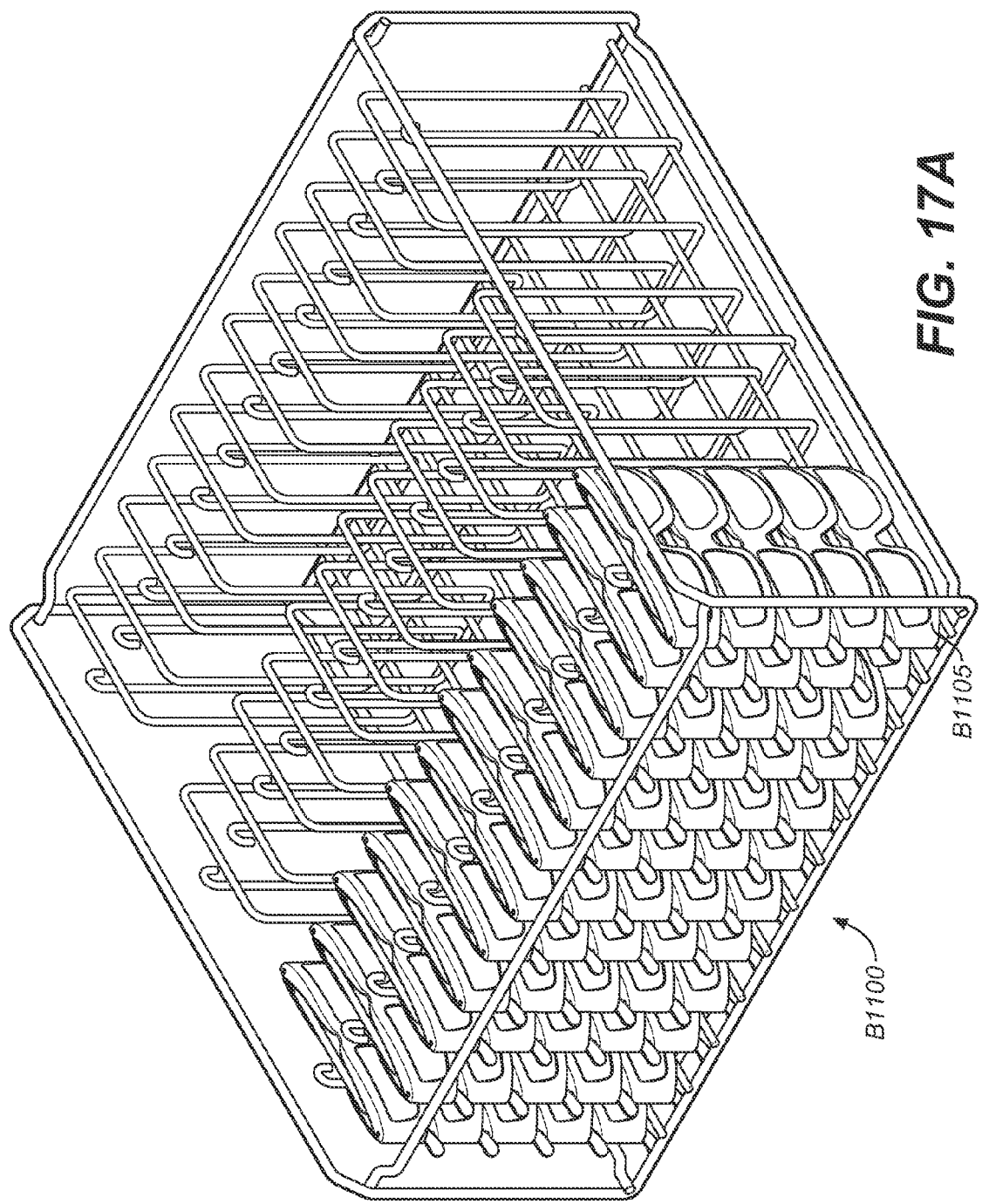
Figure 17C:
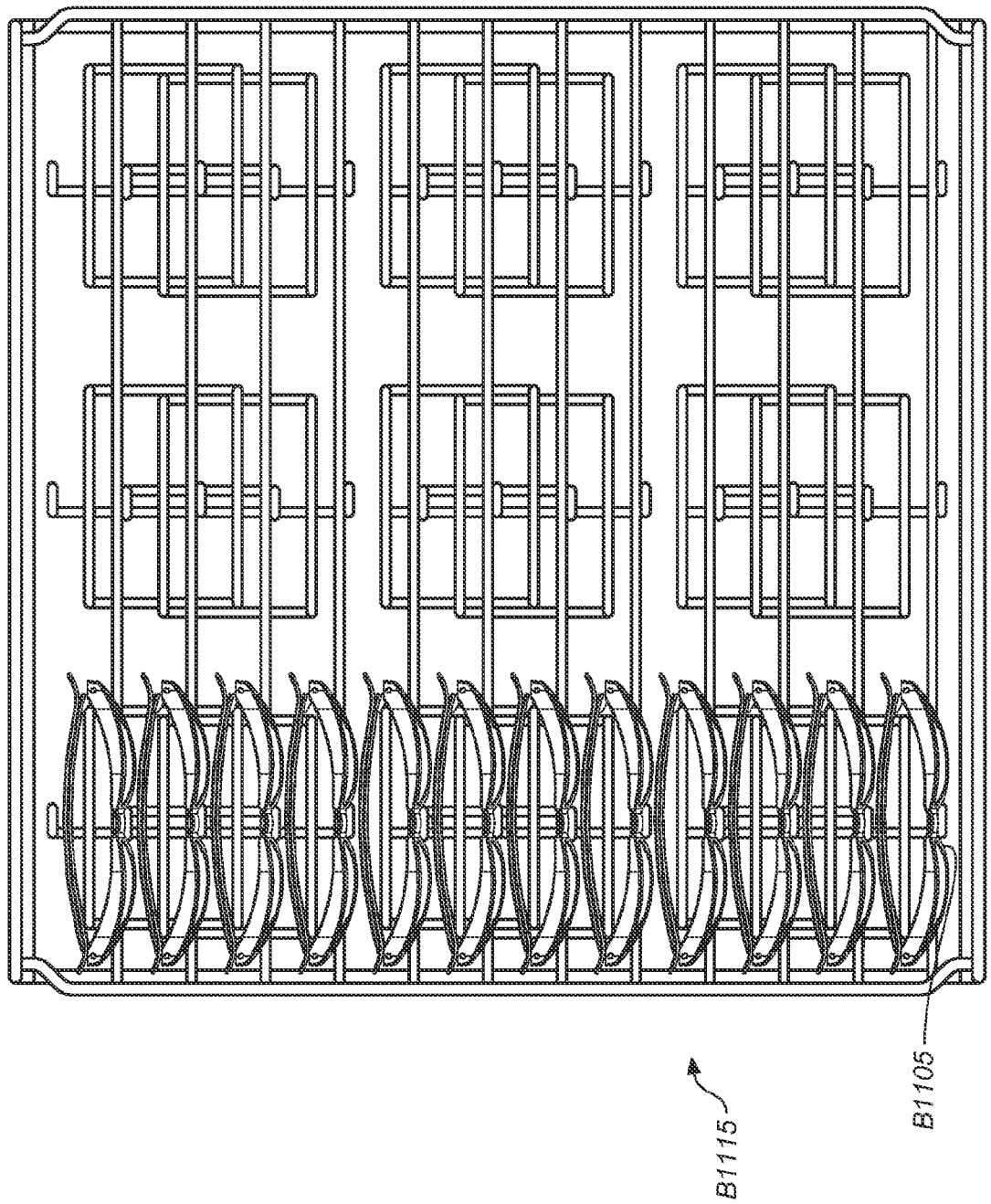

FIGS. 16A-16C are drawing views of the rack according to FIGS. 15A-15D stacked with another rack according to the present invention. As shown in a perspective view B1000, side view B1010 and front view B1020, a top portion of a first frame of a rack fits or interlocks with a bottom portion of another similar rack.

FIGS. 17A-17D are drawing views of the rack according to FIGS. 15A-15D loaded with glasses as would be utilized in a 3D rental model or other embodiments of the present invention. A perspective view B1100, side view B1110, top view B1115, and a front view B1120 illustrate the placement of stacked folded glasses (e.g., stacked folded glasses column B1105). The lenses of the folded glasses are vertically oriented.

The washing storage racks provided as described herein and their equivalents have many advantages. Among others, the rack design allows the glasses frames to overlap for space efficient packing which allows high density and efficient washing, drying and storage. The rack design may also be more packing and distribution friendly, for example, by stacking the glasses in a folded position. The rack is stackable for efficient washing, drying and storage. The rack design allows nearly vertical orientation of the lenses for efficient washing and drying which also helps to prevent spotting while drying. The rack design allows for shaking water off after washing which improves drying time and further reduces spotting during drying. The rack design allows space between both sides of lenses for air flow to improve drying time with natural ventilation, forced air or cloth dry. The rack and stacked racks are ergonomically designed for loading and handling a maximum number of glasses while maintaining a safe load (in some embodiments, 2 stacked racks are less than 40 lbs which is the maximum load for a commercial dishwasher). The rack design provides a minimal OSHA Horizontal Measurement, and Asymmetric Angle when calculating the OSHA Recommended Weight Limit (RWL) for loading a commercial dishwasher. The rack and stacked rack design also help reduce the OSHA Lifting Frequency factor by allowing a maximum number of glasses to be washed per cycle, thereby reducing the frequency of lifts per minute required between 3D movie presentations.

Weight of the racks may be reduced by reducing the gauge of the materials from which the racks are constructed. However, for strength, the outer frame should preferably maintained at a gauge sufficient to handle both picking up two fully loaded racks and sufficient to protect the glasses loaded into the frames during shipment (e.g., cargo shifts and/or dropping during shipment) or when stacked for storage (e.g., ¼" stainless steel wire). The internal and/or cross-members of the racks make better candidates for smaller gauge weight saving design modifications (e.g., 3/16" stainless steel wire). Such weight savings are realized, for example, in FIGS. 14 and 15 which illustrate selected components produced from materials of a reduced gauge. The same may be provided in other embodiments described herein and their equivalents.

Accordingly, the invention may be embodied in any of the forms described herein, including, but not limited to the following B Series Enumerated Example Embodiments (BEEEs) which describe structure, features, and functionality of some portions of the present invention:

BEEE0. A 3D glasses rental model incorporating a glasses washing rack utilized in a theater operation having at least one set of glasses worn by the public on different occasions wherein the glasses washing rack is configured to maintain glasses in a stacked formation in the glasses washing rack while installed and being washed in a washing machine.

BEEE1. A glasses washing rack utilized in a theater operation having at least one set of glasses worn by the public on different occasions wherein the glasses washing rack is configured to maintain glasses in a stacked formation in the glasses washing rack while installed and being washed in a washing machine.

BEEE2. The glasses washing rack according to BEEE1, wherein the glasses are 3D viewing glasses utilized by a digital cinema theater.

BEEE3. The glasses washing rack according to BEEE1, wherein the glasses washing rack is utilized in a process at a cinema theater where glasses are distributed from the rack and collected and stored in the rack where they remain through transport, washing, and storage until needed for redistribution.

BEEE4. The glasses washing rack according to BEEE3, wherein washing in the process is performed by a contractor that services the cinema theater.

BEEE5. A glasses washing and storage tray, comprising:
a frame; and
a first set of support members attached to the frame and configured hold a plurality of glasses on top of each other in a stack.

BEEE6. The method according to BEEE5, wherein the rack is designed to allow frames of the glasses to overlap for efficient packing and high density washing, drying, and storage, provide a nearly vertical orientation of the lenses for efficient washing, drying, and spot prevention, secure the glasses so as to allow for shaking water off after washing, provide space between both sides of lenses for air flow to improve drying time with natural ventilation, forced air, and/or cloth dry, provide ergonomically oriented features for loading and handling a maximum number of glasses while maintaining a safe OSHA approved load and rack dimensions.

BEEE7. The glasses washing and storage tray according to BEEE5, wherein the first set of support members comprises a first support member positioned to be on an outside of a pair of glasses when installed in the washing and storage tray, and a second support member positioned to be on an inside of the pair of glasses when installed in the washing and storage tray.

BEEE8. The glasses washing and storage tray according to BEEE7, wherein the first support member comprises at least one vertical bar configured to contact an outside portion of a frame of a pair of glasses when installed in the washing and storage tray.

BEEE9. The glasses according to BEEE8, wherein the second support member comprises at least one vertical bar configured to contact an inside portion of a frame of the pair of glasses when installed in the washing and storage tray.

BEEE10. The glasses washing and storage tray according to BEEE9, wherein the outside portion of the frame comprises a nose piece or bridge of the glasses, and the inside portion of the frame comprises at least one of a temple and front frame portion of the glasses.

BEEE11. The glasses according to BEEE9, wherein the second support member comprises a left vertical post configured to contact a left side of the glasses when installed and a right vertical post configured to contact a right side of the glasses when installed.

BEEE12. The glasses according to BEEE9, wherein the first support member and the second support member form a gap configured to secure glasses when installed in the tray.

BEEE13. The glasses according to BEEE12, wherein glasses, when installed in the tray, are stacked on top of each other and secured between the same first and second support members.

BEEE14. The glasses according to BEEE13, further comprising a second set of first and second support members positioned in the tray such that when additional glasses are installed in the tray, the installed glasses on the first set of support members and the second set of support members are nested and form a hollow column.

BEEE15. The glasses washing and storage tray according to BEEE14, wherein temple portions of the installed glasses are interlocked.

BEEE16. A method of 3D glasses management, comprising the steps of:
installing a set of 3D glasses in a rack wherein the glasses are stacked on top of each other with lenses of the glasses held vertically in a plurality of stacks;
transporting and storing the set of 3D glasses while installed in the rack; and
washing the set of 3D glasses while installed in the rack.

BEEE17. The method according to BEEE16, wherein the plurality of stacks are arranged in pairs of stacks with glasses in a first stack of the paired stacks facing a first direction and nested with a second stack of the paired stacks facing a second direction and pairs of glasses in the first stack are interlocked with pairs of glasses in the second stack.

BEEE18. The method according to BEEE16, wherein the step of washing is performed by a contractor offsite of a venue that utilizes the glasses.

BEEE19. The method according to BEEE16, wherein the glasses are intended to remain in the rack at all times except when distributed to a user.

BEEE20. A business architecture, comprising:
a retrieval component comprising a methodology for retrieving glasses from a 3D venue;
a washing component comprising a large scale washing device for loading glasses and washing and sterilizing the glasses; and
a delivery component comprising a delivery of washed glasses to a 3D venue.

BEEE21. The business architecture according to BEEE20, wherein the retrieval, washing, and delivery components are all performed while the glasses are loaded into a washing/storage rack.

BEEE22. The business architecture according to BEEE18, wherein the washing/storage rack comprises frame members positioned to secure the glasses in a plurality of nested interlocked stacks.

BEEE23. The business architecture according to BEEE18, wherein the washing/storage rack comprises frame members positioned to secure the glasses in a plurality of non-nested, non-interlocked stacks each pair of glasses folded with lenses held in vertical orientation.

BEEE23. The business architecture according to BEEE18, wherein the washing/storage rack comprises frame members positioned to secure the glasses in a plurality of non-nested, non-interlocked stacks each pair of glasses folded with lenses held in vertical orientation, wherein internal components of the rack are constructed of smaller gauge material compared to main frame members of the rack.

In various embodiments, the washing rack configurations described herein may be utilized, amongst other possibilities, in theater/3D venue operations, by a contractor servicing a theater/3D venue, and/or in a rental model where a theater/3D venue rents glasses (e.g., on a per use basis). Thus, the present invention provides a method, device, business architectures and more for stacking, securing, storing, and glasses, and particularly 3D glasses. The invention saves cost and is greener than current washing racks in that the efficiency of washing, amount of glasses washed per load etc. are increased reducing energy costs, the new racks are easier to load increasing employee efficiency, and the racks are less costly to manufacture. Accordingly, the invention has excellent utilitarian value for 3D cinema operators who seek to increase efficiency and reduce costs. The rack provides space for mounting glasses nested in opposite directions and stacked in a rack that is secure, and the racks themselves are stackable.

In describing preferred and exemplary embodiments of the present invention as may also be illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a frame member, any other equivalent device, such as an arm, extension, brace, bar, or other device having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to trays, interlocking mechanisms, nesting, tray stacking, process operations including any of distribution, collection, washing, transport and/or storage of glasses and racks, etc should also be considered in light of any and all available equivalents.

The present invention may suitably comprise, consist of, or consist essentially of, any of element (the various parts or features of the invention, and their equivalents as described herein. Further, the present invention illustratively disclosed herein may be practiced in the absence of any element, whether or not specifically disclosed herein. Obviously, numerous modifications and variations of the present invention are possible in light of the above teachings. And again, it is therefore to be understood that within the scope of the appended claims, the invention may be practiced otherwise than as specifically described herein.

The present invention includes a business model or architecture that includes a retrieval component for retrieving glasses from a 3D venue, a washing component comprising a large scale washing device for loading glasses and washing and sterilizing the glasses, and a delivery component comprising a delivery of washed glasses to a 3D venue. The business model may be based on a rental arrangement wherein the glasses are owned by a rental company and rented to the 3D venue. The retrieving, washing, and delivery components may be, for example, handled entirely by the rental or leasing company which then bills the venue based on how many pairs of glasses are utilized.

As noted above, a dust cover may be utilized to help prevent dust from collecting on lenses of the glasses while stored (or during transport) in the racks. The rack is also useful as part of a shipping system with boxes and/or containers, where the racks securely hold glasses and are stacked inside a shipping box and/or loaded into a container. Such shipping may be, for example, the shipment of new glasses from manufacturing to a distributor or venue, and/or shipment between remote washing facilities and a venue.

In one embodiment, the glasses are shipped in stacked racks that may be individually dust covered (or covered as a group) and loaded into re-useable shipping boxes. The shipping boxes may then be loaded into a container, trucks or other transport mechanisms. Preferably, the shipping boxes contain support mechanisms positioned to directly abut and support the larger (and stronger) frame members of the racks.

Accordingly, the invention may be embodied in any of the forms described herein, including, but not limited to the following C series Enumerated Example Embodiments (CEEEs) which describe structure, features, and functionality of some portions of the present invention:

CEEE1. A glasses washing rack utilized in a theater operation having at least one set of glasses worn by the public on different occasions wherein the glasses washing rack is configured to maintain glasses in a stacked formation in the glasses washing rack while installed and being washed in a washing machine.

CEEE2. The glasses washing rack according to CEEE1, wherein the glasses are 3D viewing glasses utilized by a digital cinema theater.

CEEE3. The glasses washing rack according to CEEE1, wherein the glasses washing rack is utilized in a process at a cinema theater where glasses are distributed from the rack and collected and stored in the rack where they remain through transport, washing, and storage until needed for re-distribution.

CEEE4. The glasses washing rack according to CEEE3, wherein washing in the process is performed by a contractor that services the cinema theater.

CEEE5. A glasses washing and storage tray, comprising:
a frame; and a first set of support members attached to the frame and configured hold a plurality of glasses on top of each other in a stack.

CEEE6. The method according to CEEE5, wherein the rack is designed to allow frames of the glasses to overlap for efficient packing and high density washing, drying, and storage, provide a nearly vertical orientation of the lenses for efficient washing, drying, and spot prevention, secure the glasses so as to allow for shaking water off after washing, provide space between both sides of lenses for air flow to improve drying time with natural ventilation, forced air, and/or cloth dry, provide ergonomically oriented features for loading and handling a maximum number of glasses while maintaining a safe OSHA approved load and rack dimensions.

CEEE7. The glasses washing and storage tray according to CEEE5, wherein the first set of support members comprises a first support member positioned to be on an outside of a pair of glasses when installed in the washing and storage tray, and a second support member positioned to be on an inside of the pair of glasses when installed in the washing and storage tray.

CEEE8. The glasses washing and storage tray according to CEEE7, wherein the first support member comprises at least one vertical bar configured to contact an outside portion of a frame of a pair of glasses when installed in the washing and storage tray.

CEEE9. The glasses according to CEEE8, wherein the second support member comprises at least one vertical bar configured to contact an inside portion of a frame of the pair of glasses when installed in the washing and storage tray.

CEEE10. The glasses washing and storage tray according to CEEE9, wherein the outside portion of the frame comprises a nose piece or bridge of the glasses, and the inside portion of the frame comprises at least one of a temple and front frame portion of the glasses.

CEEE11. The glasses according to CEEE9, wherein the second support member comprises a left vertical post configured to contact a left side of the glasses when installed and a right vertical post configured to contact a right side of the glasses when installed.

CEEE12. The glasses according to CEEE9, wherein the first support member and the second support member form a gap configured to secure glasses when installed in the tray.

CEEE13. The glasses according to CEEE12, wherein glasses, when installed in the tray, are stacked on top of each other and secured between the same first and second support members.

CEEE14. The glasses according to CEEE13, further comprising a second set of first and second support members positioned in the tray such that when additional glasses are installed in the tray, the installed glasses on the first set of support members and the second set of support members are nested and form a hollow column.

CEEE15. The glasses washing and storage tray according to CEEE14, wherein temple portions of the installed glasses are interlocked.

CEEE16. A method of 3D glasses management, comprising the steps of:
installing a set of 3D glasses in a rack wherein the glasses are stacked on top of each other with lenses of the glasses held vertically in a plurality of stacks;
transporting and storing the set of 3D glasses while installed in the rack; and
washing the set of 3D glasses while installed in the rack.

CEEE17. The method according to CEEE16, wherein the plurality of stacks are arranged in pairs of stacks with glasses in a first stack of the paired stacks facing a first direction and nested with a second stack of the paired stacks facing a second direction and pairs of glasses in the first stack are interlocked with pairs of glasses in the second stack.

CEEE18. The method according to CEEE16, wherein the step of washing is performed by a contractor offsite of a venue that utilizes the glasses.

CEEE19. The method according to CEEE16, wherein the glasses are intended to remain in the rack at all times except when distributed to a user.

CEEE20. A business architecture, comprising:
a retrieval component comprising a methodology for retrieving glasses from a 3D venue;
a washing component comprising a large scale washing device for loading glasses and washing and sterilizing the glasses; and
a delivery component comprising a delivery of washed glasses to a 3D venue.

CEEE21. The business architecture according to CEEE20, wherein the retrieval, washing, and delivery components are all performed while the glasses are loaded into a washing/storage rack.

CEEE22. The business architecture according to CEEE18, wherein the washing/storage rack comprises frame members positioned to secure the glasses in a plurality of nested interlocked stacks.

Thus, the present invention provides a method, device, business architectures and more for stacking, securing, storing, and glasses, and particularly 3D glasses. The invention saves cost and is greener than current washing racks in that the efficiency of washing, amount of glasses washed per load etc. are increased reducing energy costs, the new racks are easier to load increasing employee efficiency, and the racks are less costly to manufacture. Accordingly, the invention has excellent utilitarian value for 3D cinema operators who seek to increase efficiency and reduce costs. The rack provides space for mounting glasses nested in opposite directions and stacked in a rack that is secure, and the racks themselves are stackable.

In describing preferred and exemplary embodiments of the present invention as may also be illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a frame member, any other equivalent device, such as an arm, extension, brace, bar, or other device having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to trays, interlocking mechanisms, nesting, tray stacking, process operations including any of distribution, collection, washing, transport and/or storage of glasses and racks, etc should also be considered in light of any and all available equivalents.

The present invention may suitably comprise, consist of, or consist essentially of, any element (the various parts or features of the invention, and their equivalents as described herein). Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by letters patent of the United States is:

1. A system for monitoring usage of 3D rental glasses, comprising:
   a plurality of 3D glasses each having an RFID tag;
   a delivery, collection, and washing infrastructure configured to deliver the 3D glasses to a 3D venue for use by patrons of the 3D venue, collect used 3D glasses from the 3D venue, wash the 3D glasses;
   wherein the delivery, collection, and washing performed by the infrastructure is done with the aid of scanning the RFID tags of the glasses for inventory control and efficiency metrics; and
   a plurality of storage and washing racks each configured to hold at least a portion of the plurality of 3D glasses vertically in position with nearly vertical orientation of lenses of the 3D glasses.

2. The system according to claim 1, wherein the efficiency metrics includes data necessary to calculate a shrinkage factor attributable to a particular 3D venue.

3. The system according to claim 2, wherein the shrinkage factor is billed back to the 3D venue.

4. The system according to claim 2, wherein the shrinkage factor is utilized to maintain a steady profit margin of a vendor implementing the system.

5. The system according to claim 2, wherein the system is implemented by a vendor having an existing relationship that includes delivery of goods and/or services to the 3D venue.

6. The system according to claim 1, wherein scanning of the RFID tags occurs at least at delivery and collection of the glasses.

7. The system according to claim 6, further comprising a scanning of glasses upon inspection for quality of the glasses.

8. The system according to claim 7, further comprising an electronic database configured to track usage, including identification of 3D venue, inspections, and employee handling of each pair of 3D glasses.

9. The system according to claim 1, wherein scanning of the RFID tags occurs at least at delivery, collection, and upon inspection of the glasses performed either before or after washing.

10. The system according to claim 1, wherein each of the washing and storage racks includes an RFID device associated with the rack.

11. The system according to claim 10, wherein at least one scan of the glasses comprises a scan where the RFID of the rack can be associated with each glasses pair in that rack.

12. The system according to claim 1, further comprising 3D venue scanners configured to locate a pair of glasses inside the 3D venue.

13. A 3D glasses system, comprising:
   a plurality of 3D glasses each having an RFID tag;
   a distribution, collection, and washing infrastructure configured to deliver the 3D glasses to patrons at a 3D venue for use by the patrons at the 3D venue, collect used 3D glasses, wash the used 3D glasses;
   collecting efficiency metrics about the 3D glasses during operation of the distribution, collection, and washing infrastructure by scanning the RFID tags of the glasses; and
   linking the efficiency metrics to at least one of an inventory, cost, accounting, payment, and replacement system.

14. The 3D glasses system according to claim 13, wherein the distribution collection and washing infrastruction comprises a transportation rack configured to stack glasses on top of other glasses, one over another, while holding lenses of the stacked glasses in a vertical orientation.

15. The 3D glasses system according to claim 14, wherein the temples of the glasses are not folded and the 3D glasses are further positioned in the rack such that the temples of stacked glasses are also arranged vertically one on top of the other.

16. The 3D glasses system according to claim 13, further comprising a washing machine configured to washing the used 3D glasses while stacked in the transportation rack.

17. The 3D glasses system according to claim 16, wherein the delivery of the 3D glasses comprises delivery of used 3D glasses from the transportation rack directly to the patrons after having been washed and sanitized in the washing machine while stacked in the transportation rack.

* * * * *